(12) United States Patent
Wang et al.

(10) Patent No.: US 11,119,237 B2
(45) Date of Patent: Sep. 14, 2021

(54) METHODS AND SYSTEMS FOR DETERMINING FAST AND SLOW SHEAR DIRECTIONS IN AN ANISOTROPIC FORMATION USING A LOGGING WHILE DRILLING TOOL

(71) Applicant: SCHLUMBERGER TECHNOLOGY CORPORATION, Sugar Land, TX (US)

(72) Inventors: Pu Wang, Arlington, MA (US); Sandip Bose, Brookline, MA (US); Bikash Kumar Sinha, Cambridge, MA (US); Ting Lei, Arlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 376 days.

(21) Appl. No.: 16/093,640

(22) PCT Filed: Apr. 13, 2017

(86) PCT No.: PCT/US2017/027282
§ 371 (c)(1),
(2) Date: Oct. 14, 2018

(87) PCT Pub. No.: WO2017/180795
PCT Pub. Date: Oct. 19, 2017

(65) Prior Publication Data
US 2019/0129053 A1     May 2, 2019

Related U.S. Application Data

(60) Provisional application No. 62/322,870, filed on Apr. 15, 2016.

(51) Int. Cl.
*G01V 1/50* (2006.01)
*G01V 1/28* (2006.01)

(52) U.S. Cl.
CPC .............. *G01V 1/50* (2013.01); *G01V 1/284* (2013.01); *G01V 2200/16* (2013.01); *G01V 2210/47* (2013.01); *G01V 2210/626* (2013.01)

(58) Field of Classification Search
CPC ...... G01V 1/50; G01V 1/284; G01V 2200/16; G01V 2210/47; G01V 2210/626
See application file for complete search history.

(56) References Cited

U.S. PATENT DOCUMENTS 6,718,266 B1   4/2004   Sinha et al.
7,120,541 B2   10/2006   Wang
(Continued)

FOREIGN PATENT DOCUMENTS

WO    2015021004 A1    2/2015

OTHER PUBLICATIONS

Alford, J. et al., "Sonic Logging While Drilling-Shear Answers," Oilfield Review, 2012, 24(1), pp. 4-15.
(Continued)

*Primary Examiner* — Isam A Alsomiri
*Assistant Examiner* — Abdallah Abulaban

(57) ABSTRACT

Methods are provided for determining properties of an anisotropic formation (including both fast and slow formations) surrounding a borehole. A logging-while-drilling tool is provided that is moveable through the borehole. The logging-while drilling tool has at least one dipole acoustic source spaced from an array of receivers. During movement of the logging-while-drilling tool, the at least one dipole acoustic source is operated to excite a time-varying pressure field in the anisotropic formation surrounding the borehole. The array of receivers is used to measure waveforms arising from the time-varying pressure field in the anisotropic formation surrounding the borehole. The waveforms are processed to determine a parameter value that represents (Continued)

shear directionality of the anisotropic formation surrounding the borehole.

12 Claims, 20 Drawing Sheets

(56) References Cited

U.S. PATENT DOCUMENTS

| | | | |
|---|---|---|---|
| 8,339,897 B2 | 12/2012 | Keron et al. | |
| 2004/0158997 A1* | 8/2004 | Tang | E21B 47/026 33/304 |
| 2010/0034052 A1* | 2/2010 | Pabon | G01V 1/50 367/31 |
| 2011/0019501 A1 | 1/2011 | Market | |
| 2012/0026831 A1 | 2/2012 | Mickael | |
| 2015/0012251 A1 | 1/2015 | Horne et al. | |
| 2017/0115413 A1 | 4/2017 | Wang et al. | |
| 2017/0115414 A1 | 4/2017 | Wang et al. | |

OTHER PUBLICATIONS

Alford, R. M., "Shear Data in the Presence of Azimuthal Anisotropy: Dilley, Texas", SEG Technical Expanded Abstracts, 1986, pp. 476-479.

Arroyo Franco, J. L et al., "Sonic Investigations in and Around the Borehole," Oilfield Review, 2006, 18(1), pp. 14-31.

Bose, S. et al., "Anisotropy Processing Without Matched Cross-dipole Transmitters", presented at the 75th Annual Meeting, SEG Technical Program Expanded Abstracts, 2007, pp. 114-118.

Ekstrom, M. E., "Dispersion Estimation from Borehole Acoustic Arrays Using a Modified Matrix Pencil Algorithm", presented at the 29th Asilomar Conference on Signals, Systems, and Computers, Pacific Grove, California, USA, 1995, 1, pp. 449-453.

Esmersoy, C. et al., "Dipole shear anisotropy logging", presented at the 64th Annual Meeting, SEG Technical Program Expanded Abstracts, 1994, pp. 1139-1142.

Haldorsen, J. B. U. et al., "Borehole Acoustic Waves," Oilfield Review, 2006, 18(1), pp. 34-43.

Sinha, B. K. et al., "Borehole Dipole and Quadrupole Modes in Anisotropic Formations", 2003 IEEE Ultrasonics Symposium Proceedings, pp. 284-289.

Sinha, B. K. et al., "Elastic wave propagation in deviated wells in anisotropic formations", Geophysics, 2006, 71(6), pp. D191-D202.

Sinha, B. K. et al., "Influence of a pipe tool on borehole modes", Geophysics, 2009, 74(3), pp. E111-E123.

Sinha, B. K. et al., "Sonic logging in deviated wellbores in the presence of a drill collar", presented at the 2010 SEG Annual Meeting and Exposition, Expanded Abstracts, Denver, Colorado, USA, pp. 553-557.

Tang, X. M. et al., "A curve-fitting method for analyzing dispersion characteristics of guided elastic waves", presented at the 79th SEG Annual Meeting, Houston, SEG Technical Program Expanded Abstracts, 2009, pp. 461-465.

Wang, P. et al., "Broadband Dispersion Extraction of Borehole Acoustic Modes via Sparse Bayesian Learning", presented at the 5th IEEE International Workshop on Computational Advances in Multi-Sensor Adaptive Processing, Saint Martine, 2013, pp. 268-271.

Wang, P. et al., Dipole Shear Anisotropy Using Logging-While-Drilling Sonic Tools, presented at the SPWLA 57th Annual Symposium, Reykjavik, Iceland, 2016, 14 pages.

* cited by examiner

FIG. 9A  FIG. 9B

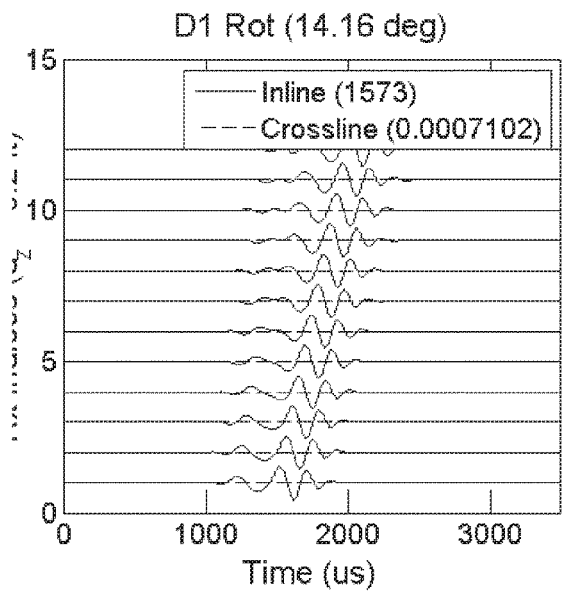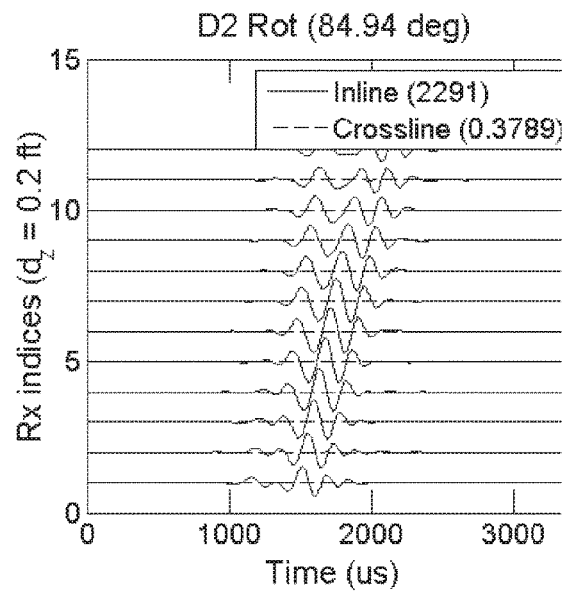
FIG. 11A
FIG. 11B
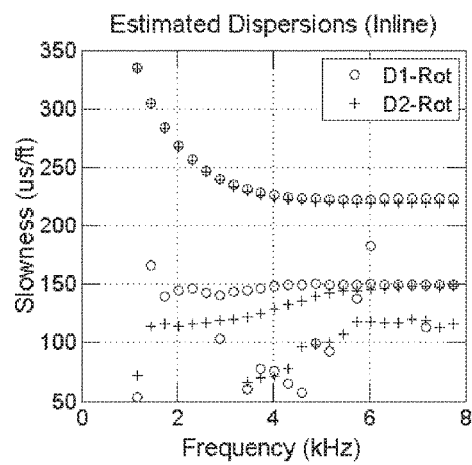
FIG. 11C

FIG. 14A  FIG. 14B

METHODS AND SYSTEMS FOR DETERMINING FAST AND SLOW SHEAR DIRECTIONS IN AN ANISOTROPIC FORMATION USING A LOGGING WHILE DRILLING TOOL

CROSS-REFERENCE TO RELATED APPLICATION(S)

The subject disclosure claims priority from U.S. Provisional Appl. No. 62/322,870, filed on Apr. 15, 2016, herein incorporated by reference in its entirety.

TECHNICAL FIELD

The subject disclosure relates to the investigation of earth formations. More particularly, the subject disclosure relates to methods of measuring formation characteristics using logging-while-drilling (LWD) acoustic measurement tools.

BACKGROUND

Wireline borehole acoustic logging is a major part of subsurface formation evaluation that is important in oil and gas exploration and production. The logging is achieved by lowering a wireline acoustic measurement tool comprising at least one transmitter and an array of receivers into a fluid-filled well, exciting the transmitter(s), recording resulting acoustic waveforms at the receivers, and processing the recorded waveforms to obtain a depth log of slowness measurements (where slowness is the reciprocal of velocity) along the well. The acoustic propagation in the borehole is affected by the properties of rocks surrounding the wellbore. More specifically, the fluid-filled borehole supports propagation of certain number of borehole guided modes that are generated by a transducer placed inside the borehole fluid. These borehole acoustic modes are characterized by their acoustic slowness dispersions which contain valuable information about the rock mechanical properties. Therefore, the acoustic logging can provide answers pertaining to such properties with diverse applications such as geophysical calibration of seismic imaging, geomechanical assessment of wellbore stability, and stress characterization for fracture stimulation. Examples of such acoustic logging are described in i) J. L. A. France, M. A. M. Ortiz, G. S. De, L. Renlie and S. Williams, "Sonic investigations in and around the borehole," *Oilfield Review*, vol. 18, no. 1, pp. 14-31, March 2006; ii) J. B. U. Haldorsen, D. L. Johnson, T. Plona, B. Sinha, H.-P. Valero and K. Winker, "Borehole acoustic waves," *Oilfield Review*, vol. 18, no. 1, pp. 34-43, March 2006; and iii) J. Alford, M. Blyth, E. Tollefsen, J. Crowe, J. Loreto, S. Mohammed, V. Pistre, and A. Rodriguez-Herrera, "Sonic logging while drilling—shear answers," *Oilfield Review*, vol. 24, no. 1, pp. 4-15, January 2012.

Logging-while-drilling (LWD) acoustic tools such as SonicScope 475 and SonicScope 825 of Schlumberger Technology Corporation have been demonstrated to save a great amount of rig time and to help improve the drilling efficiency and safety. Processing of the sonic data from the LWD acoustic tools provides monopole compressional and shear slownesses in fast formations and quadrupole shear slowness mostly in slow formations. However, both monopole and quadrupole shear slownesses cannot provide a complete anisotropy characterization.

To have a complete anisotropy characterization, one of the most important inputs is the fast-shear azimuthal direction and/or slow shear azimuthal direction, which are desirable for subsequent stress and mechanical analyses of the rock properties around the borehole.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods are provided for determining properties of an anisotropic formation (including both fast and slow formations) surrounding a borehole. A logging-while-drilling tool is provided that is moveable through the borehole. The logging-while drilling tool has at least one dipole acoustic source spaced from an array of receivers. During movement of the logging-while-drilling tool, the at least one dipole acoustic source is operated to excite a time-varying pressure field in the anisotropic formation surrounding the borehole. The array of receivers are used to measure waveforms arising from the time-varying pressure field in the anisotropic formation surrounding the borehole. The waveforms are processed to determine shear directionality of the anisotropic formation surrounding the borehole.

Additional aspects, embodiments, objects and advantages of the disclosed methods may be understood with reference to the following detailed description taken in conjunction with the provided drawings.

BRIEF DESCRIPTION OF THE DRAWINGS

FIGS. 9A and 9B illustrate synthetic time-domain waveforms arising from non-orthogonal D1 and D2 firings, respectively, of a dipole transmitter in the horizontal section of a fast TIV formation.

FIGS. 11A and 11B illustrate rotated time-domain waveforms arising from non-orthogonal D1 and D2 firings, respectively, for the example of FIGS. 9A, 9B and 9C.

FIG. 11C illustrates the slowness dispersions of the rotated time-domain waveforms of FIGS. 11A and 11B in the horizontal section of the fast TIV formation.

FIGS. 14A and 14B illustrate rotated time-domain waveforms arising from non-orthogonal D1 and D2 firings, respectively, for the example of FIGS. 12A, 12B and 12C.

DETAILED DESCRIPTION

Figure 2:
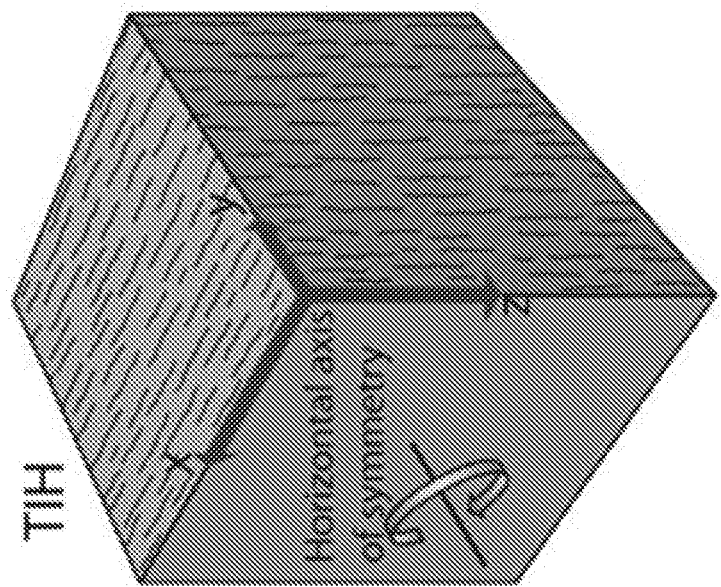
FIG. 2 is a schematic diagram of a transversely isotropic formation with a horizontal axis of symmetry (TIH).

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

As used throughout the specification and claims, the term "downhole" refers to a subterranean environment, particularly in a well or wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this disclosure, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. Chemicals and chemical properties of interest in oilfield exploration and development may also be measured and stored by the sensing systems contemplated by the present disclosure. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Borehole acoustic logging is a major part of subsurface formation evaluation that is key to oil and gas exploration and production. The logging may be achieved using an acoustic measurement tool, which includes one or multiple acoustic transducers, or sources, and one or multiple sensors, or receivers. The acoustic measurement tool may be deployed in a fluid-field wellbore for purposes of exciting and recording acoustic waveforms. The receivers thus, may acquire data representing acoustic energy that results from the acoustic energy that is emitted by the acoustic sources of the acoustic measurement tool.

The acoustic propagation in the borehole is affected by the properties of rocks surrounding the wellbore. More specifically, the fluid-filled borehole supports propagation of certain number of borehole guided modes that are generated by energy from a source that is placed inside the borehole fluid. These borehole acoustic modes are characterized by their acoustic slowness (i.e., reciprocal of velocity) dispersions, which contain valuable information about the rock mechanical properties. Therefore, the acoustic logging may provide answers pertaining to such diverse applications as geophysical calibration of seismic imaging, geomechanical assessment of wellbore stability, and stress characterization for fracture stimulation. In the context of this application, "acoustic energy" or "sonic energy" refers to energy in the sonic frequency spectrum, and may be, as example, energy between 200 Hertz (Hz) and 30 kiloHertz (kHz).

In general, the energy that is emitted by the sources of the acoustic measurement tool may travel through rock formations as either body waves or surface waves (called "flexural waves" herein). The body waves include compressional waves, or P-waves, which are waves in which small particle vibrations occur in the same direction as the direction in which the wave is traveling. The body waves may also include shear waves, or S-waves, which are waves in which particle motion occurs in a direction that is perpendicular to the direction of wave propagation. In addition to the body waves, there are a variety of borehole guided modes whose propagation characteristics can be analyzed to estimate certain rock properties of the surrounding formation. For instance, axi-symmetric Stoneley and borehole flexural waves are of particular interest in determining the formation shear slownesses. As described herein, the flexural waves may also include waves that propagate along the acoustic measurement tool.

The acoustic measurement tool may include multiple acoustic sources that are associated with multiple source classifications, or categories. For example, the acoustic measurement tool may include one or multiple monopole sources. In response to energy from a monopole sonic source, the receivers of the acoustic measurement tool may acquire data representing energy attributable to various wave modes, such as data representing P-waves, S-waves and Stoneley waves.

The acoustic measurement tool may also include one or multiple directional sources, such as dipole or quadrupole sources, which produce additional borehole guided waves, which travel through the fluid in the borehole and along the acoustic measurement tool itself. Data representing these flexural waves may be processed for such purposes as determining the presence or absence of azimuthal anisotropy. For example, implementations that are described herein, the data representing the flexural waves is processed for purposes of determining a formation shear slowness.

The speeds at which the aforementioned waves travel are affected by various properties of the downhole environment, such as the rock mechanical properties, density and elastic dynamic constants, the amount and type of fluid present in the formation, the makeup of rock grains, the degree of inter-grain cementation and so forth. Therefore, by measuring the speed of acoustic wave propagation in the borehole, it is possible to characterize the surrounding formations based on sensed parameters relating to these properties. The speed, or velocity of a given sonic wave, or waveform, may be expressed in terms of the inverse of its velocity, which is referred to herein as the "slowness." In this context, an "acoustic wave" or "acoustic waveform" may refer to a particular time segment of energy recorded by one or multiple receivers and may correspond to a particular acoustic waveform mode, such as a body wave, flexural or other guided borehole waves.

Certain acoustic waves are non-dispersive, or do not significantly vary with respect to frequency. Other acoustic waves, however, are dispersive, meaning that the wave-slownesses vary as a function of frequency.

The acoustic measurement tool may be deployed on a number of platforms, such as a wireline tool or a logging while drilling (LWD) platform. In other words, an LWD acoustic measurement tool is disposed on a drilling string, or pipe. Newly introduced logging-while-drilling (LWD) acoustic measurement tools have been demonstrated to save a great amount of rig time and to help drill more efficiently with greater safety margins. Recent progress has enabled LWD acoustic measurement tools to deliver compressional and shear slowness logs in the fast and slow formations using monopole and quadrupole transmitters. In this context, a "fast formation" refers to a formation in which the shear wave velocity is greater than the compressional velocity of the borehole fluid (or "drilling mud"). Otherwise, the formation is a "slow" formation.

Figure 1:
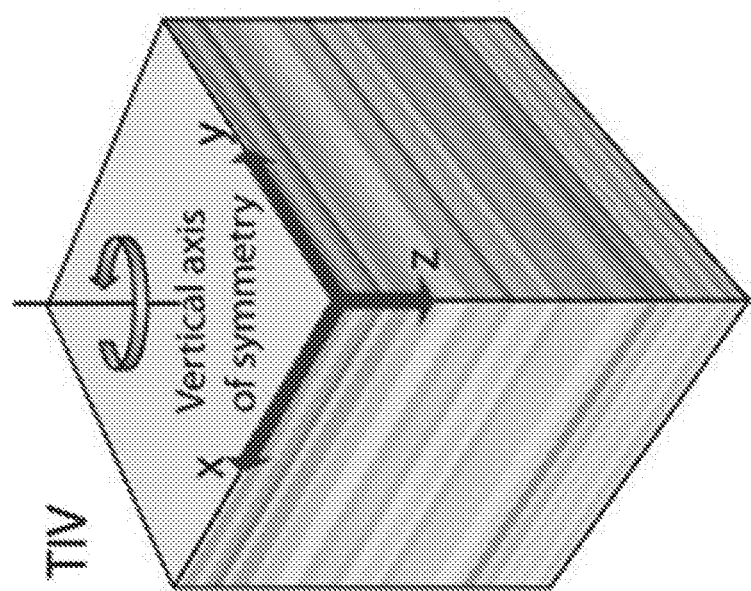
FIG. 1 is a schematic diagram of a transversely isotropic formation with a vertical axis of symmetry (TIV).

However, due to their azimuthal characteristics, the LWD acoustic measurement tools can be used to obtain only a single reliable shear slowness estimate which is appropriate for isotropic and TIV (transversely isotropic with a vertical axis of symmetry) formations. An example TIV formation is shown in FIG. 1. In the TIV formation, elastic properties are uniform horizontally, but vary vertically.

Currently, there are no reliable techniques for obtaining the fast and slow shear slownesses in anisotropic formations (such as transversely isotropic with a horizontal axis of symmetry or TIH formations) or orthorhombic formations, because they require the use of directional dipole firings. For example, see i) J. Alford, M. Blyth, E. Tollefsen, J. Crowe, J. Loreto, S. Mohammed, V. Pistre, and A. Rodriguez-Herrera, "Sonic logging while drilling—shear answers," *Oilfield Review*, vol. 24, no. 1, pp. 4-15, January 2012; ii) B. K. Sinha and E. Simsek, "Sonic logging in deviated wellbores in the presence of a drill collar", 2010 *SEG Annual Meeting and Exposition*, Expanded Abstracts, Denver, Colo.; iii) B. K. Sinha, E. Simsek, and Q-H. Liu, "Elastic wave propagation in deviated wells in anisotropic formations", *Geophysics,* 71(6), D191-D202, 2006; iv) B. K. Sinha, J. Pabon and C-J. Hsu, "Borehole dipole and quadrupole modes I anisotropic formations", 2003 IEEE Ultrasonics Symposium Proc., 284-289; and v) B. K. Sinha, E. Simsek, and S. Asvadurov, "Influence of a pipe tool on borehole modes", *Geophysics*, vol. 74(3), May-June, 2009. An example TIH formation is shown in FIG. 2. In the TIH formation, elastic properties are uniform in vertical planes parallel to fractures, but vary in the perpendicular horizontal direction.

In an anisotropic formation, firing of the dipole transmitters generally excites both the fast and slow flexural waves, behaving like the shear-wave splitting, with different polarizations and different velocities. The shear waves polarized parallel to layering in the TIV formation (e.g., a shale) or vertical fractures in the TIH formation (e.g., a formation with aligned vertical fractures) travel faster than the shear waves polarized orthogonal to the layering or fracture. Therefore, the azimuth direction of the fast shear, slow shear and flexural waves can be detected by using firing from cross-dipole transmitters (e.g., cross-dipole orthogonal firings) in a wireline acoustic measurement tool. Once the azimuth direction of the fast shear and slow shear is determined, the raw dipole waveforms can be rotated to yield waveforms propagating with the fast and slow shear polarizations. Then the fast and slow shear slownesses can be extracted from these rotated waveforms corresponding to the fast and slow shear azimuth directions. In summary, both the fast and slow shear slownesses together with the fast shear azimuth direction are inputs to a complete formation anisotropy characterization.

Wireline acoustic measurement tools, such as Schlumberger's Sonic Scanner™, has been commercialized to provide such complete formation anisotropy characterization. However, the same anisotropy characterization has not been available in LWD acoustic measurement tools, due to a number of fundamental challenges in LWD acoustic measurement tools. These challenges include the following:
- strong interference and coupling from collar modes in LWD acoustic measurement tools;
- cross-dipole orthogonal firing cannot be maintained in LWD acoustic measurement tools;
- tool eccentering in LWD acoustic measurement tools; and
- signal-to-noise ratio (SNR) in LWD acoustic measurement tools.

Figure 3:
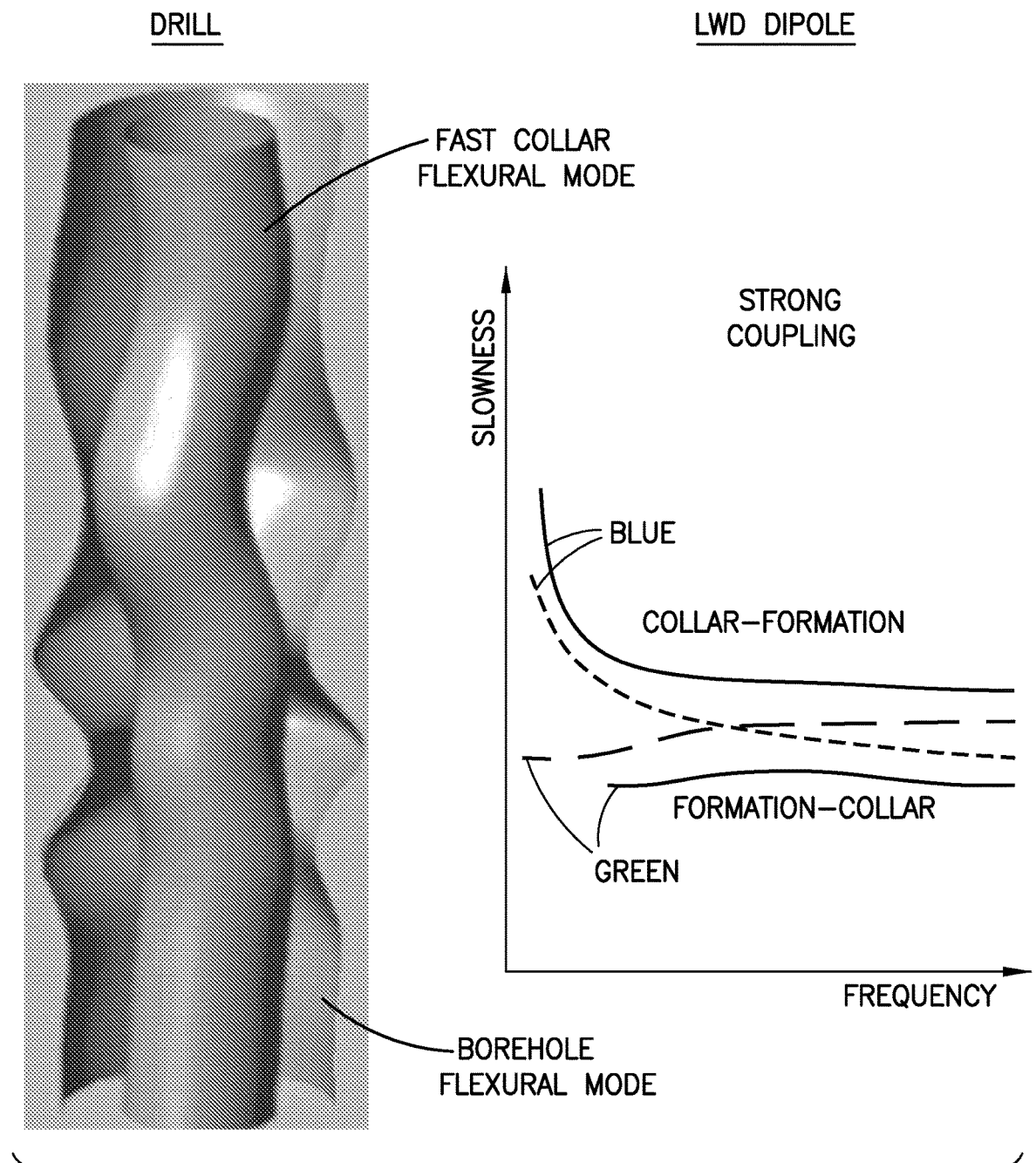
FIG. 3 is a schematic diagram illustrating a drill-colar mode (dashed curve labeled "blue") that propogates in a Logging-While-Drilling (LWD) acoustic measurement tool and that interferes with a formation mode (dashed curve labeled "green").

With regard to the first challenge regarding strong interference and coupling from collar modes in the LWD acoustic measurement tool, the LWD acoustic measurement tool has to be mechanically competent for drilling and the drill-collar mode interferes with the formation mode of interest. This is unlike the wireline Sonic Scanner™. In fact, the drill-collar mode dominates the acoustic response especially for the dipole flexural modes in fast formations and strongly couples with the formation mode of interest. Note that a LWD acoustic measurement tool consists of a stiff drill collar to survive the harsh drilling environment. As shown in FIG. 3, the stiff drill-collar supports propagation of a drill-collar mode (dashed blue curve) that interferes with a formation flexural mode (dashed green curve). The drill-collar mode intersects the formation flexural mode in a fast formation. As these two modes interact in a composite structure, they cannot simply overlay on top of each other. Instead, they repel one from the other to form the coupled collar-formation mode (top blue solid curve, also referred to as the tool flexural mode) and the formation-collar mode (bottom green solid curve, also referred to as the formation flexural mode). Moreover, the drill-collar flexural mode is usually the dominant one. Therefore, a conventional wireline dipole workflow developed for handling a single formation mode cannot be applied to this complex scenario.

Figure 4A:
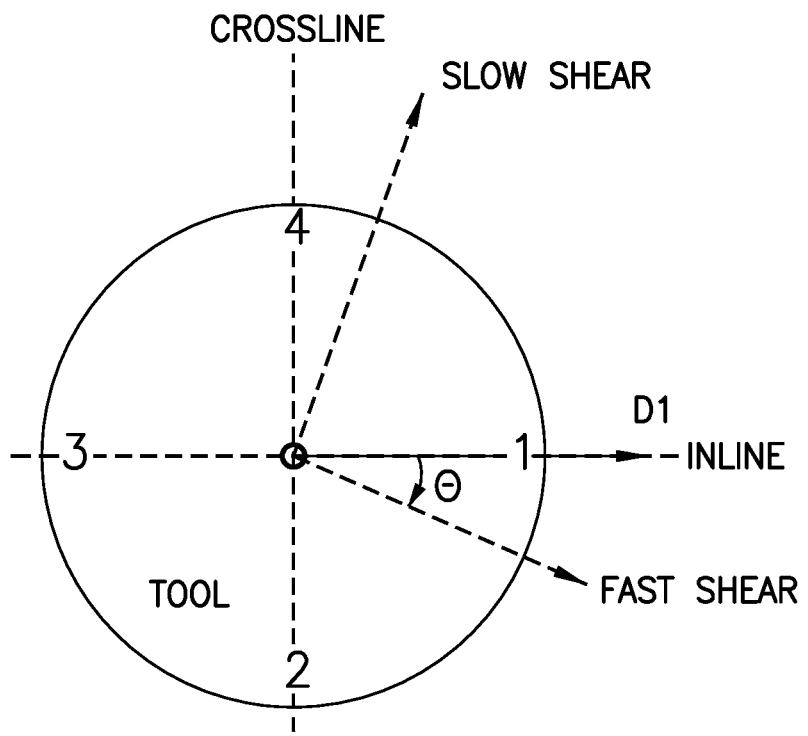
FIGS. 4A and 4B are schematic diagrams illustrating cross-dipole orthogonal firing of a wireline acoustic measurement tool.
Figure 4B:
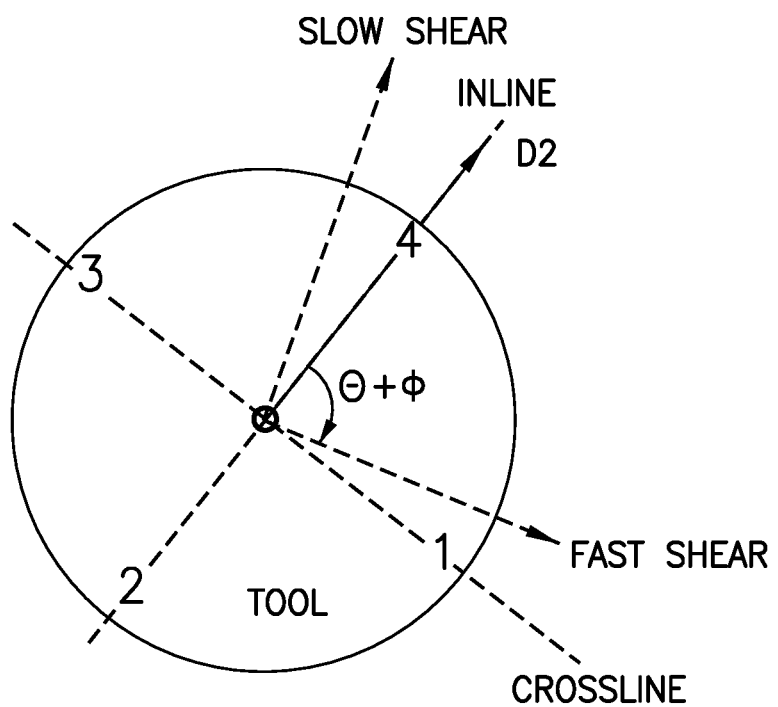

The second challenge stems from the fact that the cross-dipole orthogonal firing is unavailable in the LWD acoustic measurement tool due to tool pipe rotation and therefore cannot be assumed. The cross-dipole orthogonal firing in a wireline acoustic measurement tool is shown in FIGS. 4A and 4B. The wireline acoustic measurement tool includes an array of receivers or receiver stations (labeled 1, 2, 3, 4) that are offset at 90 degrees relative to one another about the circumference of the wireline acoustic measurement tool. FIG. 4A shows the cross-sectional coordinate system of the X-Dipole firing. The X-Dipole direction, which is denoted by the solid line with arrow, is offset $\theta$-degrees from the fast shear direction. This fast shear direction aligns with the inline receivers (e.g., the azimuthal receiver stations 1 and 3) and perpendicular to the crossline receivers (e.g., the azimuthal receiver stations 2 and 4) of the receiver array for the X-Dipole firing. The fast and slow shear directions are denoted as dashed black lines with arrows in FIG. 4A. FIG. 4B shows the cross-sectional coordinate system of the Y-Dipole firing. The Y-Dipole direction, which is denoted by the solid line with arrow, is $(\theta+90°)$-degree away from the fast shear direction. This fast shear direction aligns with the inline receivers (e.g., the azimuthal receiver stations 2 and 4) and perpendicular to the crossline receivers (e.g., the azimuthal receiver stations 1 and 3) for the Y-dipole firing. The fast and slow shear directions are denoted as dashed black lines with arrows in FIG. 4B. The cross-dipole orthogonal firing (X-dipole firing/Y-dipole firing) of the wireline acoustic measurement tool enables acquisition of four-component waveforms for the receiver array. The four-component waveforms include an X-Inline waveform, an X-Crossline waveform, a Y-Inline waveform, and a Y-Crossline waveform. The four-component waveforms can be synthetically rotated towards the fast and slow shear polarization directions by minimizing the total crossline energy, for example via the Alford rotation algorithm as described in i) R. M. Alford, "Shear data in the presence of azimuthal anisotropy," 56th Ann. Internat. Mtg., Sot. Explor. Geophys., Expanded Abstracts, 476-479, 1986; and ii) C. Esmersoy, K. Koster, M. Williams, A. Boyd and M. Kane, "Dipole shear anisotropy logging", 64th Ann. Internat. Mtg., Soc. Expl. Geophys., Expanded Abstracts, 1139-1142, 1994.

Figure 5A:
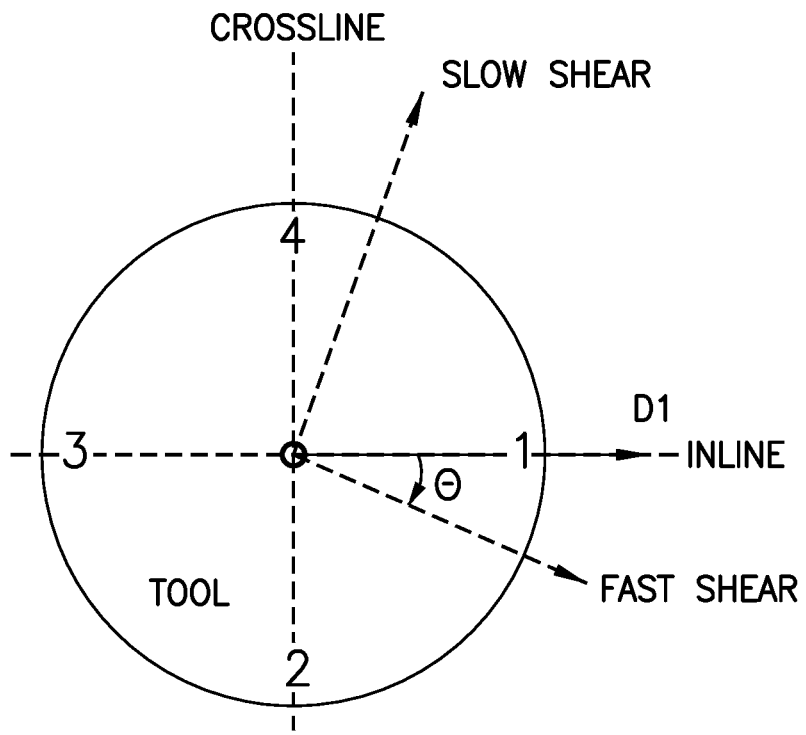
FIGS. 5A and 5B are schematic diagrams illustrating non-orthogonal dipole firings of an LWD acoustic measurement tool.
Figure 5B:
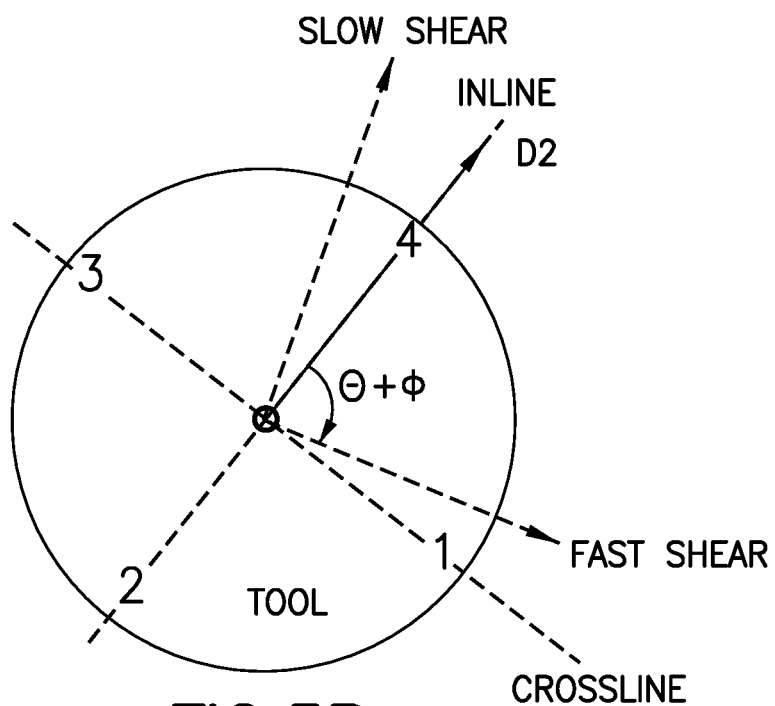

In contrast to the wireline acoustic measurement tool, the orthogonality of the two LWD dipole firings for each depth is no longer maintained due to the fast tool rotation with variable speeds during the drilling process. An example of the two LWD dipole firings is shown in FIGS. 5A and 5B. Note that the LWD acoustic measurement tool also includes an array of receivers or receiver stations (labeled 1, 2, 3, 4) that are offset at 90 degrees relative to one another about the circumference of the LWD acoustic measurement tool. FIG. 5A shows the cross-sectional coordinate system of the D1 (Dipole-1) firing. The D1 direction, which is denoted by the solid line with arrow, is offset $\theta$-degrees from the fast shear direction. This fast shear direction aligns with the inline receivers (e.g., the azimuthal receiver stations 1 and 3) and perpendicular to the crossline receivers (e.g., the azimuthal receiver stations 2 and 4) of the receiver array for the D1 firing. The fast and slow shear directions are denoted as dashed black lines with arrows in FIG. 5A. FIG. 5B shows the cross-sectional coordinate system of the D2 firing. The D2 direction, which is denoted by the solid line with arrow, is offset $(\theta+\varphi)$-degrees from the fast shear direction. The fast shear direction aligns with the inline receivers (e.g., the azimuthal receiver stations 2 and 4) and perpendicular to the crossline receivers (e.g., the azimuthal receiver stations 1 and 3) of the array for the D2 firing. The D1 and D2 dipole firings of the LWD acoustic measurement tool enables acquisition of four-component waveforms for the receiver array. The four-component waveforms include an X-Inline waveform, an X-Crossline waveform, a Y-Inline waveform, and a Y-Crossline waveform. Due to the non-orthogonal nature of the D1 and D2 firings, the four-component Alford waveform rotation used for the wireline acoustic measurement tool cannot be applied to the four-components waveforms of the LWD acoustic measurement tool.

The third challenge stems from eccentering of the LWD acoustic measurement tool during the LWD operations. Since the fast rotation of drill string precludes the use of centralizers with the LWD acoustic measurement tools, stabilizers are used to limit the amount of eccentering. However, the use of these stabilizers cannot provide a complete centralization of the LWD acoustic measurement tool. The amount of tool eccentering is further aggravated in deviated wells. Large amount of eccentering poses additional challenges for the anisotropic processing of LWD dipole sonic data.

The fourth challenge stems from the SNR of the LWD acoustic measurement tool. Compared with the wireline logging environment, the acquired data in the LWD environment is usually corrupted by the drilling noise, shocks, and vibration. Furthermore, the directional nature of the dipole transmitters precludes the use of waveform stacking as used for the monopole and quadrupole logging with a rotating drill string.

To overcome the aforementioned challenges, the present disclosure introduces two independent workflows that can be used to calculate a parameter value that characterizes the fast shear azimuth direction of the formation from the processing of dipole waveforms acquired by an LWD-acoustic measurement tool. The first workflow consists of a time-domain, non-orthogonal waveform rotation algorithm using the four-component waveforms from the two non-orthogonal LWD dipole firings. The second workflow is based on a frequency-domain processing of the dipole sonic data. This processing is a multi-component rotation algorithm that accounts for the presence of the drill collar and its associated drill-collar flexural mode in the recorded dipole waveforms. The output from either of the two workflows is a parameter value that represents the fast shear azimuth direction of the formation, which can be used as an input to the formation stress and fracture analyses. For example, the parameter value that represents the fast shear azimuth direction of the formation can be used to synthetically rotate the LWD dipole waveforms acquired by a LWD acoustic measurement tool to point toward the fast and slow shear directions. Then the fast and slow formation shear slownesses can be estimated from the rotated waveforms using a data-driven or model-based and/or workflow. Thus, by cascading the LWD dipole waveform rotation and the dipole shear slowness estimation, complete characterization of the anistropy of the formation can be provided by the LWD tool.

An example of a workflow that estimates fast and slow formation shear slownesses from acoustic waveforms is described in U.S. patent application Ser. No. 15/331,946, filed on Oct. 24, 2016, entitled "Determining Shear Slowness from Dipole Source-based Measurements Acquired by a Logging-While-Drilling Acoustic Measurement Tool." In this workflow, for the case where the acoustic measurements are acquired in a fast formation and are associated with a relatively high SNR (an SNR at, near or above 20 dB, for example), the fast and slow formation shear slownesses can be determined from a low frequency formation flexural asymptote engine, which bases the shear slowness determination on a low-frequency asymptote of extracted flexural dispersions. For the other cases (slow formations or fast formation coupled with a lower SNR), the fast and slow formation shear slownesses can be determined from a model-based inversion engine, which employs a model that explicitly accounts for the presence of the acoustic measurement tool in the borehole. As such, the model-based inversion engine may consider such model inputs as compressional slowness, formation density, mud density, hole diameter, and so forth. Therefore, for the slow formation, when the tool flexural acoustic mode significantly interferes with the formation flexural acoustic mode at the low frequency region, the model-based inversion is used, as the low-frequency asymptote of the extracted flexural dispersion no longer converges to the shear slowness. In accordance with example implementations, the model-based inversion engine can use a boundary condition determinant associated with a concentrically placed cylindrical structure to construct the cost function and estimate multiple physical parameters of interest from numerical optimization techniques.

Another example of a workflow that estimates fast and slow formation shear slownesses from acoustic waveforms is described in U.S. patent application Ser. No. 15/331,958, filed on Oct. 24, 2016, entitled "Determining Shear Slowness Based on a High Order Formation Flexural Acoustic Mode." In this workflow, acoustic modes (including the first and third order formation flexural acoustic modes) are extracted from the acoustic waveforms. The extracted acoustic modes are processed by a high frequency slowness frequency analysis (HF-SFA) engine based on input parameters (such as a slowness range and a frequency range). These ranges may be user selected, in accordance with example implementations. The HF-SFA engine non-coherently integrates the dispersion energy along the frequency axis to provide an output. A peak finding engine identifies at least one peak in the integrated energy, and this peak corresponds to an estimated or determined shear slowness.

Figure 6:
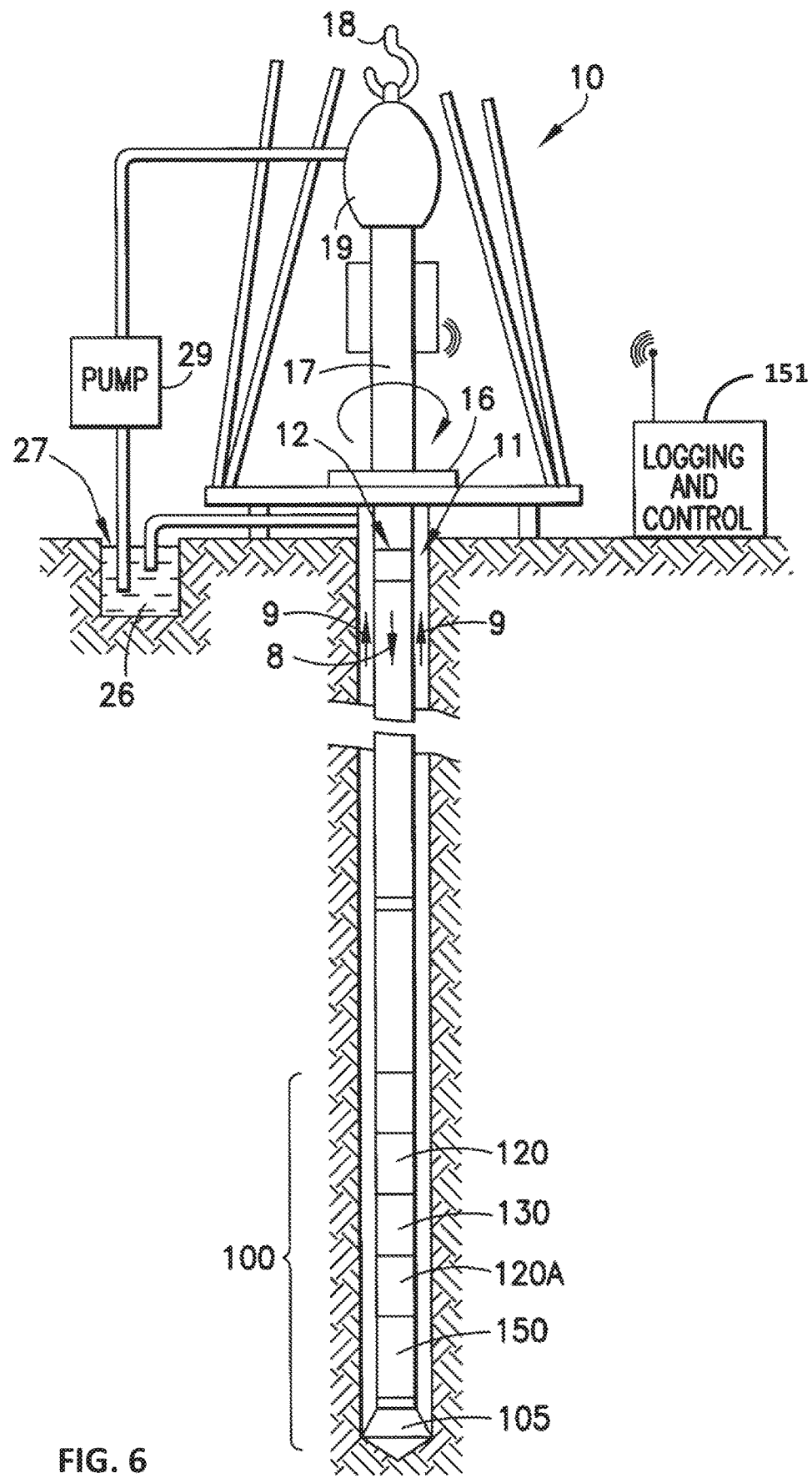
FIG. 6 is a schematic diagram of a wellsite system that can be used in practicing the embodiments of the subject disclosure.

FIG. 6 illustrates a wellsite system in which the workflows of the present disclosure can be employed. The wellsite can be onshore or offshore. In this exemplary system, a borehole 11 is formed in subsurface formations by rotary drilling in a manner that is well known. Embodiments of the present disclosure can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11. The assembly 10 includes a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment has a logging-while-drilling (LWD) tool 120, a measuring-while-drilling (MWD) tool 130, a roto-steerable system 150, and drill bit 105. In other embodiments, the bottom hole assembly 100 can include a mud motor that is powered by the flow of the drilling fluid and drives the rotation of the drill bit 105.

The LWD tool 120 is housed in a special type of drill collar, as is known in the art, and can contain one or a plurality of known types of logging tools. It will also be understood that more than one LWD and/or MWD tools can be employed, e.g. as represented at 120A. The LWD tool includes capabilities for measuring, processing, and storing information, as well as for communicating with the surface equipment. In the present embodiment, the LWD tool 120 includes at least a dipole transmitter that transmits directional D1 and D2 dipole firings and an array of receivers for receiving the four-component waveforms of the acoustic energy that results from the directional D1 and D2 dipole firings as described herein.

The MWD module 130 is also housed in a special type of drill collar, as is known in the art, and can contain one or more devices for measuring characteristics of the drill string and drill bit. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device. The LWD tool further includes an apparatus (not shown) for generating electrical power to the downhole system. This may typically include a mud turbine generator powered by the flow of the drilling fluid, it being understood that other power and/or battery systems may be employed.

Figure 7:
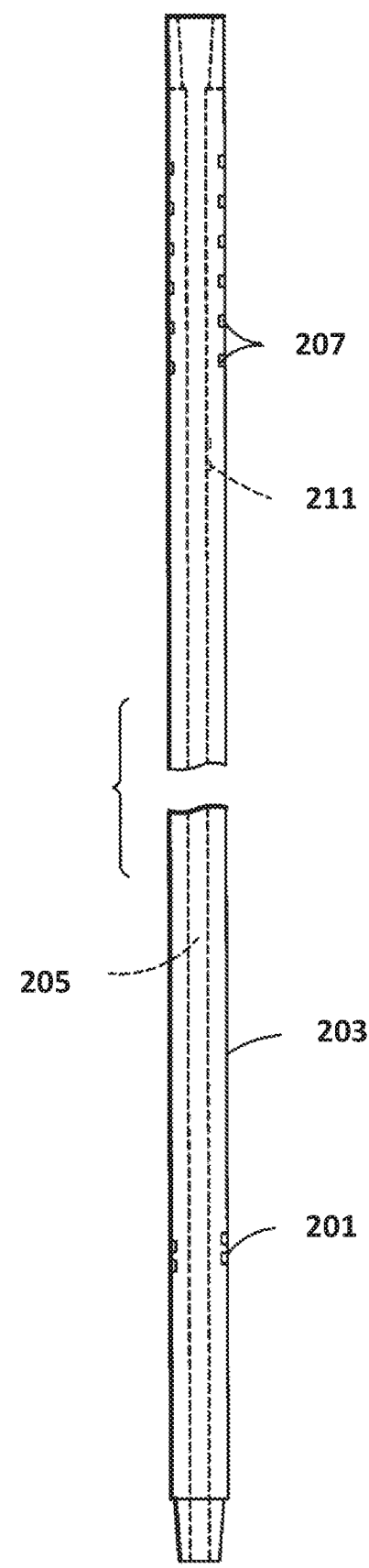
FIG. 7 is a schematic diagram of a LWD acoustic measurement tool that can be used in practicing the embodiments of the subject disclosure.

FIG. 7 schematically illustrates selected components of the acoustic measurement LWD module 120 of FIG. 6 according to embodiments of the subject disclosure. A pipe portion 203 defines a mud channel 205. Distributed on the pipe portion 203 is a number of acoustic transmitters including a pair of dipole transmitters 201 that transmit directional D1 and D2 dipole firings. An array of receivers 207 and receiver electronics 211 are distributed on the pipe portion 203. The array of receivers receive the four-component waveforms of the acoustic energy that results from the directional D1 and D2 dipole firings as described herein. A surface-located processing facility 151 (FIG. 6) controls the D1 and D2 firings of the dipole transmitters 201 and the receiver electronics 211. The processing facility 151 can be located in one or more locations at the wellsite. According to some embodiments, the processing facility 151 can process and interpret the data from the acoustic measurement LWD module 120 at one or more locations remote from the wellsite. The processing facility 151 may include one or more central processing units, storage systems, communications and input/output modules, a user display, and a user input system.

Time-Domain Workflow

Figure 8:
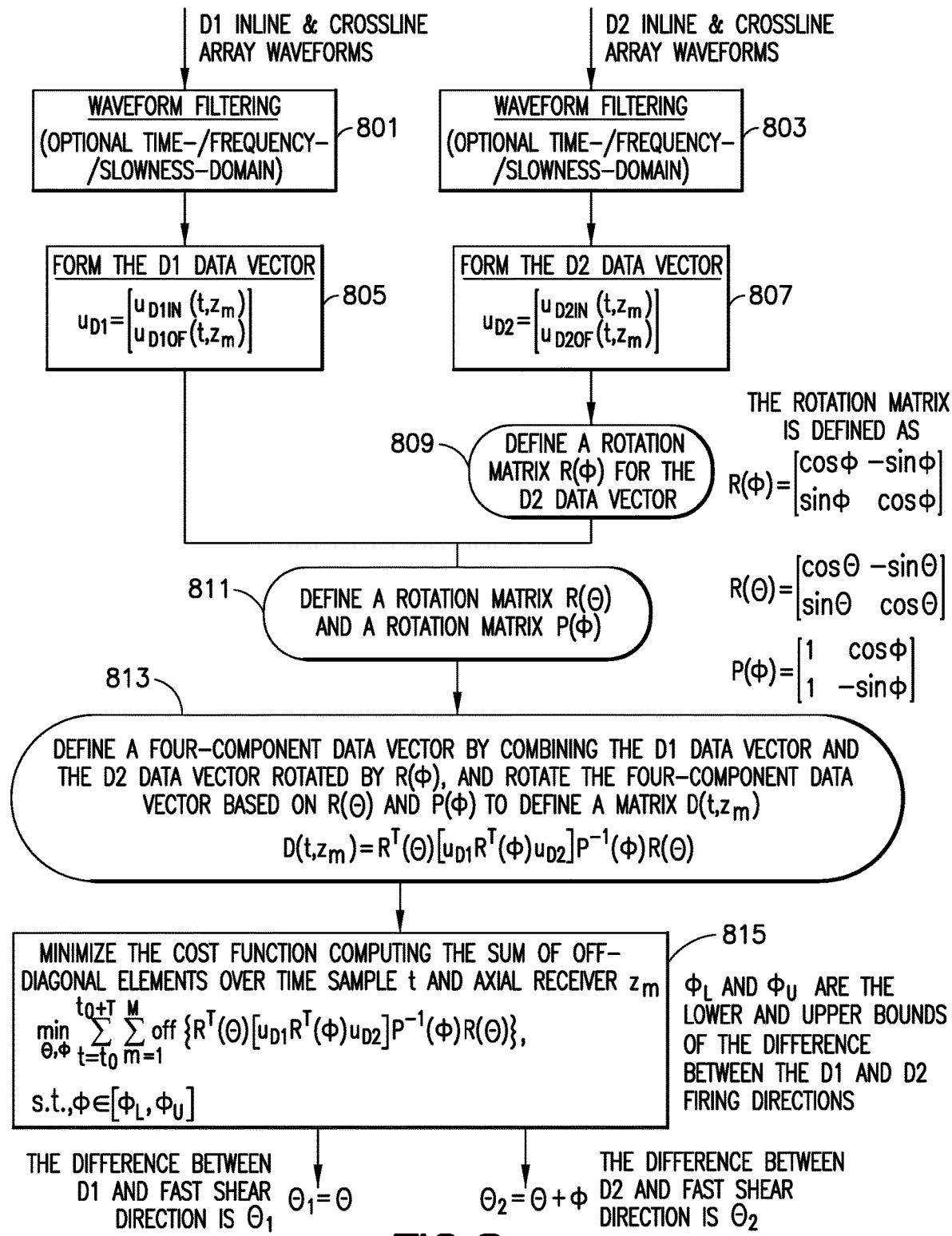
FIG. 8 is a flowchart illustrating a time-domain workflow according to an embodiment of the subject disclosure.

An embodiment of the first workflow that employs a time-domain LWD four-component waveform rotation scheme is summarized in the flow chart of FIG. 8. The embodiment follows the geometry of the D1 and D2 dipole firing and the inline and crossline waveforms received by the receiver array described above with respect to FIGS. 5A and 5B.

In optional block 801, the time domain inline and crossline array waveforms of the acoustic energy arising from the D1 LWD dipole firing as received by the receivers of the receiver array can be filtered to remove unwanted noise components. Such filtering can be carried out in one or more domains, such as in the time domain (e.g., time window processing), frequency domain (e.g., bandpass filtering), the slowness domain (e.g., semblance, Nth-root stacking processing), and in the time-frequency domain (using wavelets or other time-frequency representations).

In optional block 803, the time domain inline and crossline array waveforms of the acoustic energy arising from the D2 LWD dipole firing as received by the receivers of the receiver array can be filtered to remove unwanted noise components. Such filtering can be carried out in one or more domains, such as in the time domain (e.g., time window processing), frequency domain (e.g., bandpass filtering), the slowness domain (e.g., semblance, Nth-root stacking processing), and in the time-frequency domain (using wavelets or other time-frequency representations).

In block 805, the time-domain inline and crossline array waveforms corresponding to the D1 LWD dipole firing as provided by the waveform filtering of block 801 (or as received by the receivers of the receiver array if the waveform filtering of block 801 is omitted) can be represented as a D1 data vector/matrix $u_{D1}$ as follows:

$$u_{D1}(t, z_m) = \begin{bmatrix} u_{D1IN}(t, z_m) \\ u_{D1OF}(t, z_m) \end{bmatrix} \qquad \text{Eqn. (1)}$$

where $u_{D1IN}(t, z_m)$ and $u_{D1OF}(t, z_m)$ are, respectively, the time-doman inline and crossline array waveforms at the m-th receiver at a given time t, and $z_m$ denotes the axial location of the m-th receiver.

In total there are M receivers. For example, FIGS. 5A and 5B illustrate an example where there are 4 azimuthal receivers at a given axial location. Other embodiments can use more than four azimuthal receivers at a given axial location. The azimuthal receiver configuration can be stacked/replicated over a number of axial locations offset from the dipole source for increased sensitivity. In this case, the number of azimuthal receivers at each axial location can be summed together with a sinusoidal function as weights to give the M total receivers.

In an anisotropic formation, the time-domain inline array waveforms $u_{D1IN}$ and crossline array waveforms $u_{D1OF}$ arising from the D1 dipole firing consist of contributions from both the fast and slow shear propagations of the D1 dipole firing. As a result, the D1 data vector/matrix $u_{D1}$ can be represented as follows:

$$\begin{aligned} u_{D1} &= \begin{bmatrix} u_{D1IN}(t, z_m) \\ u_{D1OF}(t, z_m) \end{bmatrix} \qquad \text{Eqn. (2)} \\ &= \begin{bmatrix} \cos\theta & -\sin\theta \\ \sin\theta & \cos\theta \end{bmatrix} \begin{bmatrix} s(t)*g_f(t, z_m) & 0 \\ 0 & s(t)*g_s(t, z_m) \end{bmatrix} \\ &\quad \begin{bmatrix} \cos\theta & \sin\theta \\ -\sin\theta & \cos\theta \end{bmatrix} \begin{bmatrix} 1 \\ 0 \end{bmatrix} \\ &\triangleq R(\theta)D(t, z_m)R^T(\theta)S \end{aligned}$$

Note that the rotation matrix $R(\theta)$ is used to project the waveforms twice, one from the D1 dipole source to the fast/slow shear directions and another (the transpose of the rotation matrix $R(\theta)$) from the fast/slow shear directions to the receiver $z_m$. The matrix $D(t, z_m)$ denotes the propagating waveforms directly in the fast and slow shear directions (e.g., the diagonal elements). The vector S is a selection vector for the two-component waveforms for the D1 dipole firing.

In block 807, the time-domain inline and crossline array waveforms corresponding to the D2 LWD dipole firing as provided by the waveform filtering of block 803 (or as received by the receivers of the receiver array if the waveform filtering of block 803 is omitted) can be represented in a D2 data/vector matrix form. Assuming the source signatures from the D1 and D2 dipole firings are the same, the time-domain inline and crossline array waveforms corresponding to the D2 LWD dipole firing can be represented as a D2 data/vector matrix $u_{D2}$ as follows:

$$u_{D2} = \begin{bmatrix} u_{D2IN}(t, z_m) \\ u_{D2OF}(t, z_m) \end{bmatrix} \quad \text{Eqn. (3)}$$

$$= \begin{bmatrix} \cos(\theta + \phi) & -\sin(\theta + \phi) \\ \sin(\theta + \phi) & \cos(\theta + \phi) \end{bmatrix}$$

$$\begin{bmatrix} s(t) * g_f(t, z_m) & 0 \\ 0 & s(t) * g_s(t, z_m) \end{bmatrix}$$

$$\begin{bmatrix} \cos(\theta + \phi) & \sin(\theta + \phi) \\ -\sin(\theta + \phi) & \cos(\theta + \phi) \end{bmatrix} \begin{bmatrix} 1 \\ 0 \end{bmatrix}$$

$$\triangleq R(\theta + \phi) D(t, z_m) R^T(\theta + \phi) S$$

Note that the rotation matrix $R(\theta+\phi)$ for the D2 dipole firing employs a rotation angle of $\theta+\phi$. Note that the rotation matrix $R(\theta+\phi)$ is used to project the waveforms twice, one from the D2 dipole source to the fast/slow shear directions and another (the transpose of the rotation matrix $R(\theta+\phi)$) from the fast/slow shear directions to the receiver $z_m$. The matrix $D(t, z_m)$ denotes the propagating waveforms directly in the fast and slow shear directions (e.g., the diagonal elements). The vector S is a selection vector for the two-component waveforms for the D2 dipole firing.

It is worth noting that the rotation matrix $R(\theta+\phi)$ has the following property:

$$R(\theta+\phi)=R(\phi)R(\theta),$$

$$R(\theta)R^T(\theta)=I_2 \quad \text{Eqn. (4)}$$

where $I_2$ is the identity matrix of dimension 2.

Therefore, the Eqn. (3) arising from the D2 dipole firing is equivalent to:

$$U_{D2}=R(\phi)R(\theta)D(t,z_m)R^T(\theta)R^T(\phi)S \quad \text{Eqn. (5)}$$

In block 809, a rotation matrix $R(\phi)$ is defined for the D2 data/vector $u_{D2}$ as:

$$R(\phi) = \begin{bmatrix} \cos\phi & -\sin\phi \\ -\sin\phi & \cos\phi \end{bmatrix} \quad \text{Eqn. (6)}$$

Note that the angle $\phi$ represents the angle difference between the D1 and D2 firings as follows:

$$R^T(\phi)u_{D2} = R(\theta)D(t, z_m)R^T(\theta)\tilde{S} \quad \text{Eqn. (7)}$$

$$\text{where } \tilde{S} = R^T(\theta)S = \begin{bmatrix} \cos\phi \\ -\sin\phi \end{bmatrix}.$$

Note that the rotation matrix $R^T(\phi)$ is the transpose of the rotation matrix $R(\phi)$).

In block 811, rotation matrix $R(\theta)$ and rotation matrix $P(\theta)$ are defined as follows:

$$R(\theta) = \begin{bmatrix} \cos\theta & -\sin\theta \\ -\sin\theta & \cos\theta \end{bmatrix}, \text{ and} \quad \text{Eqn. (8)}$$

$$P(\phi) = \begin{bmatrix} 1 & \cos\phi \\ 1 & -\sin\phi \end{bmatrix}.$$

In block 813, a four-component data vector u can be defined by combining the D1 data vector/matrix $u_{D1}$ from the D1 dipole firing (block 805) and the rotated data vectors $R^T(\phi)u_{D2}$ from the D2 dipole firing (block 807 and Eqn. (6)) as follows:

$$u = [u_{D1} \ R^T(\phi)u_{D2}] = R(\theta)D(t, z_m)R^T(\theta)[S, \tilde{S}] \quad \text{Eqn. (9)}$$

$$= R(\theta)D(t, z_m)R^T(\theta)\begin{bmatrix} 1 & \cos\phi \\ 0 & -\sin\phi \end{bmatrix}$$

$$= R(\theta)D(t, z_m)R^T(\theta)P(\phi)$$

Furthermore, the four-component data vector u can be rotated based on the rotation matrices $R(\theta)$ and $P(\phi)$ (Eqn. (8)) to define a matrix $D(t, z_m)$ as follows:

$$D(t,z_m)=R^T(\theta)[u_{D1}R^T(\phi)u_{D2}]P^{-1}(\phi)R(\theta) \quad \text{Eqn. (10)}$$

Then, in block 815, a cost function that involves the total crossline energy of the matrix $D(t, z_m)$ across all of the M receivers and all time samples can be evaluated and minimized by computer-implemented methods as follows:

$$\min_{\theta,\phi} \sum_{t=t_0}^{t_0+T} \sum_{m=1}^{M} \text{off}\{D(t, z_m)\} = \quad \text{Eqn. (11)}$$

$$\min_{\theta,\phi} \sum_{t=t_0}^{t_0+T} \sum_{m=1}^{M} \text{off}\{R^T(\theta)[u_{D1}\ R^T(\phi)u_{D2}]P^{-1}(\phi)R(\theta)\}$$

where off {D} computes the sum of all off-diagonal elements of D, $t_0$ is the time index of the first sample, and T is the total sample duration.

In certain scenarios, a magnetometer of the LWD acoustic measurement tool can measure both D1 and D2 firing azimuth directions up to a certain precision with respect to a reference (e.g., the direction of gravity). Such output can provide an a priori range of $\theta$: $\theta \in [\theta_{1l}, \theta_{1h}]$) and $(\theta+\phi)$: $(\theta+\phi) \in [\theta_{2l}, \theta_{2h}]$ with respect to the same reference direction. This provides a feasible range of the angle $\phi$ as follows:

$$\phi \in [\theta_{2l}-\theta_{1h}, -\theta_{1l}] \quad \text{Eqn. (12)}$$

Therefore, the two rotation angles $\theta$, $\phi$ can be determined by computer-implemented methods that solve the following constrained minimization problem:

$$\min_{\theta,\phi} \sum_{t=t_0}^{t_0+T} \sum_{m=1}^{M} \text{off}\{R^T(\theta)[u_{D1}\ R^T(\phi)u_{D2}]P^{-1}(\phi)R(\theta)\}, \quad \text{Eqn. (13)}$$

$$\text{s.t., } \phi \in [\theta_{2l} - \theta_{1h}, \theta_{2h} - \theta_{1l}]$$

Once $\theta$ and $\phi$ have been determined, the fast shear direction of the formation can be calculated as $\theta_1=\theta$ degrees away from the D1 dipole firing direction. In other words, the value of the parameter $\theta_1$ represents the fast shear direction of the formation. The fast shear direction of the formation can also be calculated as $\theta_2=(\theta+\phi)$ degrees away from the D2 dipole firing direction. In other words, the value of the parameter $\theta_2$ represents the fast shear direction of the formation. The slow shear direction of the formation can be calculated by an offset of 90° relative to the fast shear direction of the formation as is evident from FIGS. 5A and 5B.

Note that if the angle difference between the D1 and D2 firing is known (e.g., the D1 and D2 firing directions can be determined precisely), the rotation angle $\phi$ is known and the two-dimensional minimization of Eqn. (13) reduces to a one-dimensional minimization over $\theta$.

In order to validate the first workflow, consider an example of the horizontal section of a fast TIV formation (e.g., the Bakken shale formation). The synthetic data, generated by forward modeling code, simulates a fast formation with an LWD acoustic measurement tool centered in the borehole. The formation, mud and tool parameters of the forward modeling code are listed in Table 1 below:

TABLE 1

| Parameters | Values | Units |
|---|---|---|
| DTs(slow) | 2170 (141) | m/s (us/ft) |
| DTs(fast) | 2619 (116) | m/s (us/ft) |
| DTc | 3473 (88) | m/s (us/ft) |
| $\rho_F$ | 2230 | kg/m$^3$ |
| DTm | 1500 (203) | m/s (us/ft) |
| $\rho_M$ | 1000 | kg/m$^3$ |
| DTs$_{tool}$ | 3110 (98) | m/s (us/ft) |
| DTc$_{tool}$ | 5751 (53) | m/s (us/ft) |
| $\rho_T$ | 7630 | kg/m$^3$ |
| D | 0.1600 (6.3) | m (in) |

Figure 9C:
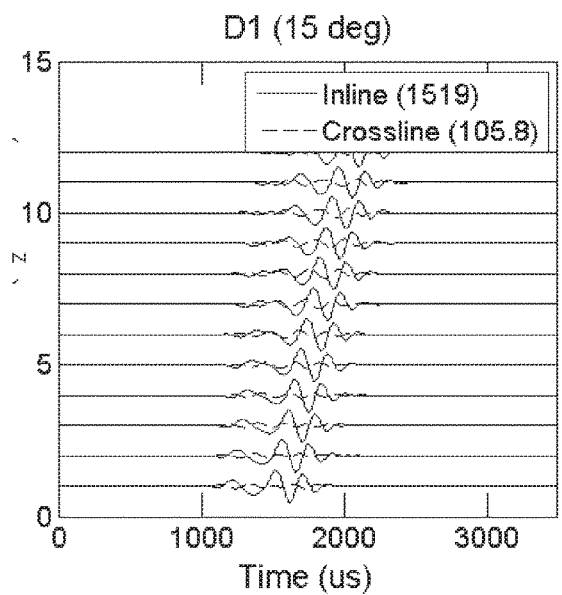
FIG. 9C illustrates the slowness dispersions of the synthetic time-domain waveforms of FIGS. 9A and 9B in the horizontal section of a fast TIV formation.
Figure 9C:
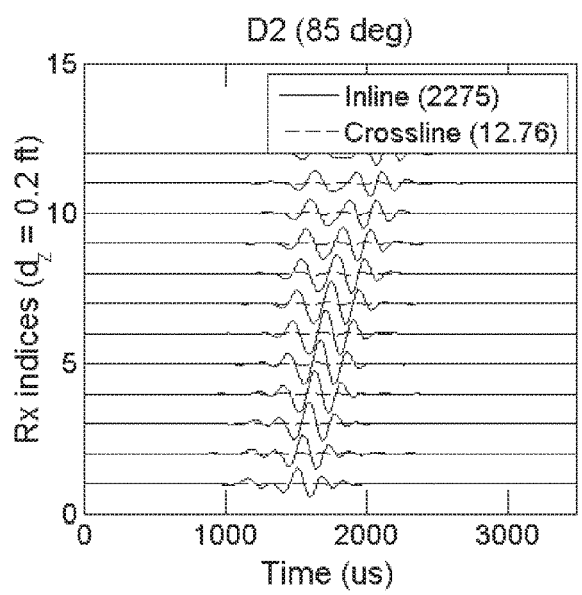
Figure 9C:
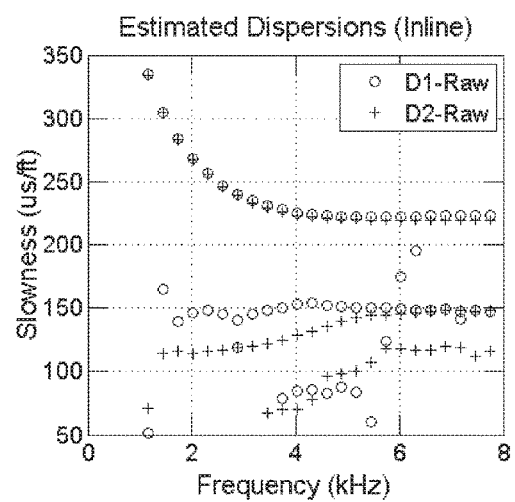

The LWD acoustic measurement tool contains 12 axial receivers placed at a distance from 7 ft to 10.6 ft away from a dipole transmitter with an inter-element spacing of 0.2 ft. FIGS. 9A and 9B show the synthetic received time-domain array waveforms generated from the dipole transmitter in the horizontal section of the fast TIV formation. The D1 and D2 firings are, respectively, 15 and 85 degrees away from the slow shear azimuth. In this case, the D1 inline array waveforms are mostly dominated by the propagation from the slow shear direction, while the D2 inline array waveforms are mostly dominated by the propagation from the fast shear direction. FIG. 9C shows the slowness dispersions generated from the dipole transmitter in the horizontal section of the fast TIV formation. The slowness dispersions represent the dipole flexural dispersion extracted by the matrix pencil method, referred to as the TKO algorithm and described in M. P. Ekstrom, "Dispersion estimation from borehole acoustic arrays using a modified matrix pencil algorithm," Proc. 29th Asilomar Conf. Signals, Syst., Comput., vol. 2, Pacific Grove, Calif., November 1995, pp. 449-453. FIG. 9C shows that two flexural modes are present in the fast TIV formation. The upper branch (above 200 us/ft) is the dominant drill-collar flexural dispersion, while the lower branch is the formation flexural dispersion. The low frequency asymptotes of the formation flexural dispersions (D1 shown with dots labeled with "○" and D2 shown with dots labeled with "+") approach to the fast and slow shear slownesses in Table 1. Specifically, the formation flexural dispersion of D1 is similar to the slow flexural dispersion as D1 is close to the slow shear azimuth.

Figure 10:
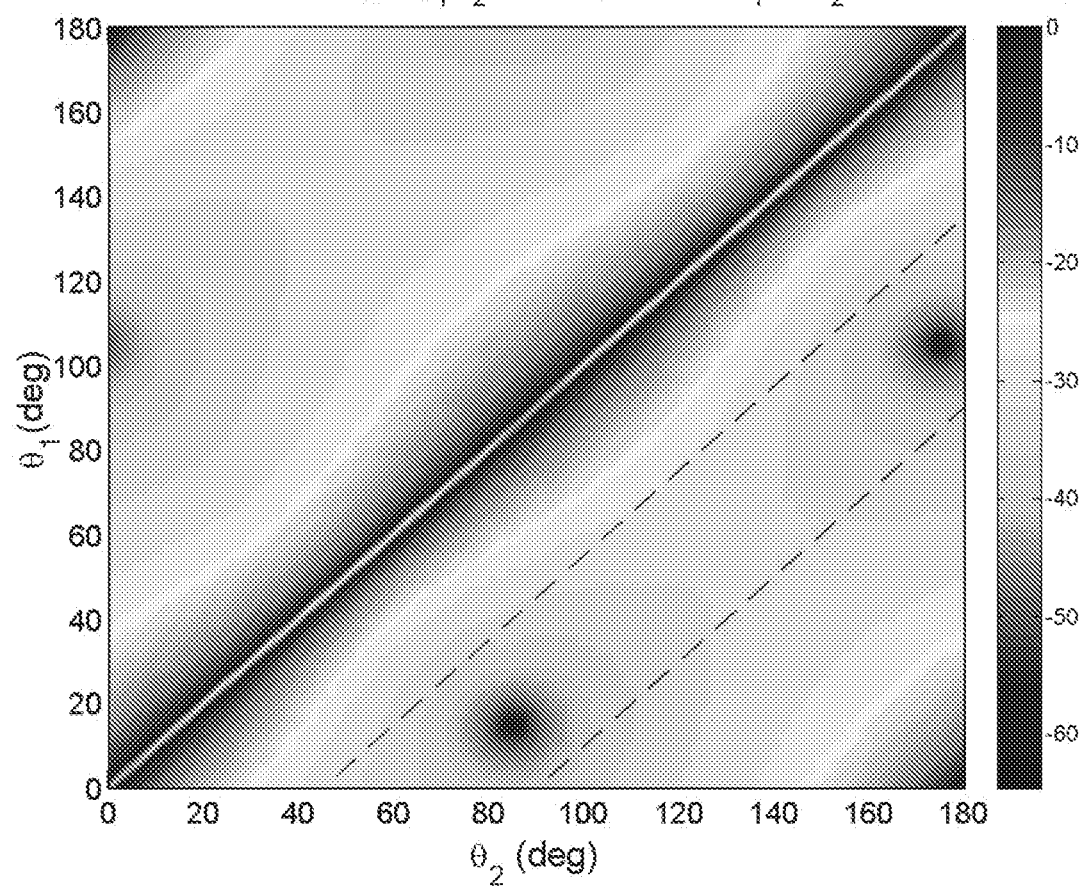
FIG. 10 illustrates a two-dimensional cost function of the four-component non-orthogonal LWD waveform rotation for the example of FIGS. 9A, 9B and 9C.

FIG. 10 shows a two-dimensional cost function of the four-component non-orthogonal LWD waveform rotation in the $(\theta_1=\theta_2=\theta+\phi)$ plane (Block 815 of FIG. 8) for the synthetic example of FIGS. 9A and 9B. The two dashed lines are constraints for the upper and lower limit of the angle difference between the D1 and D2 firing directions. Such constraints can be derived from the tolerance of D1 and D2 firing directions as measured during rotation of the LWD acoustic measurement tool, for example by a magnometer. It is easy to observe that the global minima are located at (14.2°, 84.9°) and (104.2°, 174.9°) for [θ, θ+φ]. Note that there is a 90° ambiguity in the [θ, θ+φ] plane as one can rotate D1 to the fast shear direction and D2 to the slow shear direction or vice versa. Since the workflow values the cost function to find the minimization of the total crossline energy, the coordinates of the global minima give the estimated rotation angles. From FIG. 10, the workflow searches for the minima within a bounded region (in between the two dashed lines) and the local minima are seen at ($\theta_1$=14.2°, $\theta_2$=84.9°) and ($\theta_1$=104.2°, $\theta_2$=174.9°), where the former one gives the slow shear polarization direction (i.e., 14.2° away from the D1 firing or 84.9° away from the D2 firing) and the latter one yields the fast shear direction due to a 90° ambiguity. Nevertheless, the 90° ambiguity can be removed by rotating the four-component waveforms and identifying which rotated waveforms correspond to the fast and slow flexural waveforms as described in C. Esmersoy, K. Koster, M. Williams, A. Boyd and M. Kane, "Dipole shear anisotropy logging", 64th Ann. Internat. Mtg., Soc. Expl. Geophys., Expanded Abstracts, 1139-1142, 1994.

FIGS. 11A and 11B show the rotated inline and crossline array waveforms for the D1 and D2 dipole firings of FIGS. 9A and 9B. Particularly, the D1 firing is rotated to the slow shear direction while D2 is rotated towards the fast shear direction using the estimated rotation angles from FIG. 10. Note that the crossline energy of the rotated waveforms is significantly minimized and the inline waveform energy is enhanced. The modified matrix pencil algorithm (TKO method) can be used to extract the dispersion curves from the rotated inline array waveforms of D1 and D2. FIG. 11C shows the corresponding slowness dispersions. Note that formation flexural dispersion (dots labeled with "○") of the rotated D1 captures the slow flexural wave, while the formation flexural dispersion (dots labeled with "+") of the rotated D2 converges to the fast flexural shear around 110 us/ft.

Figure 12A:
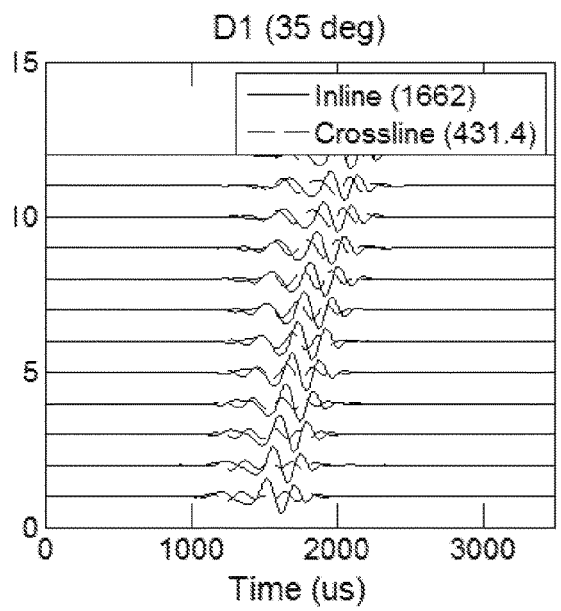
FIGS. 12A and 12B illustrate synthetic time-domain waveforms arising from non-orthogonal D1 and D2 firings, respectively, from a dipole source in the horizontal section of a fast TIV formation. The D1 and D2 firings are, respectively, 35 and 67 degrees away from the slow shear azimuth.
Figure 12B:
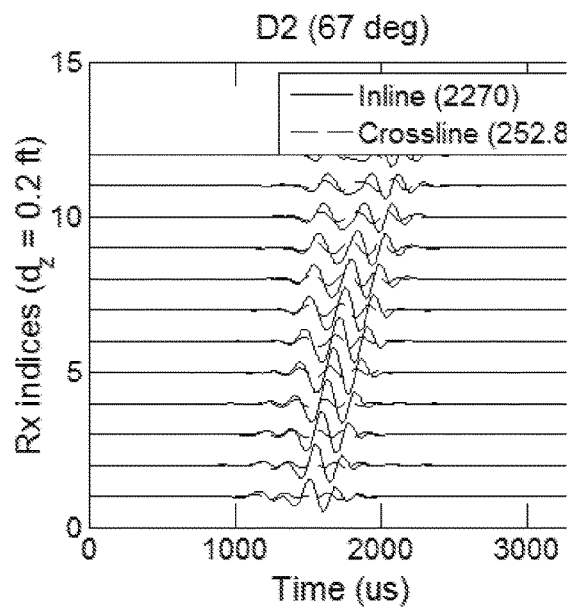
Figure 12C:
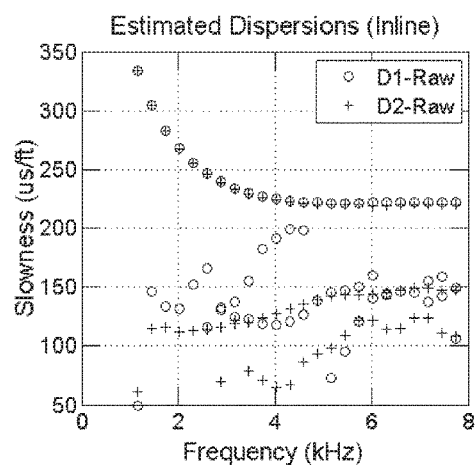
FIG. 12C illustrates the slowness dispersions of the time-domain waveforms of FIGS. 12A and 12B in the horizontal section of the fast TIV formation.

FIGS. 12A and 12B show synthetic time-domain array waveforms arising from the D1 and D2 firings of the dipole transmitter in the horizontal section of a fast TIV formation. The D1 and D2 firings are, respectively, 35° and 67° away from the slow shear azimuth. In this case, the D1 and D2 inline array waveforms contain a mixture of both the fast and slow flexural waves. Note that the inline and crossline array waveforms for the D1 and D2 dipole firings are closer to an azimuth direction in between the fast and slow shear direction. Specifically, the the D1 and D2 dipole firings are 35° and 67° away from the slow shear direction, respectively. Compared with the case of FIGS. 9A and 9B, more waveform energy is split into the crossline channel, as both dipole firings move away from either the fast or slow shear directions. FIG. 12C shows the corresponding slowness dispersions. In FIG. 12C, one can no longer see the formation flexural splitting at low frequencies from the inline receivers.

Figure 13:
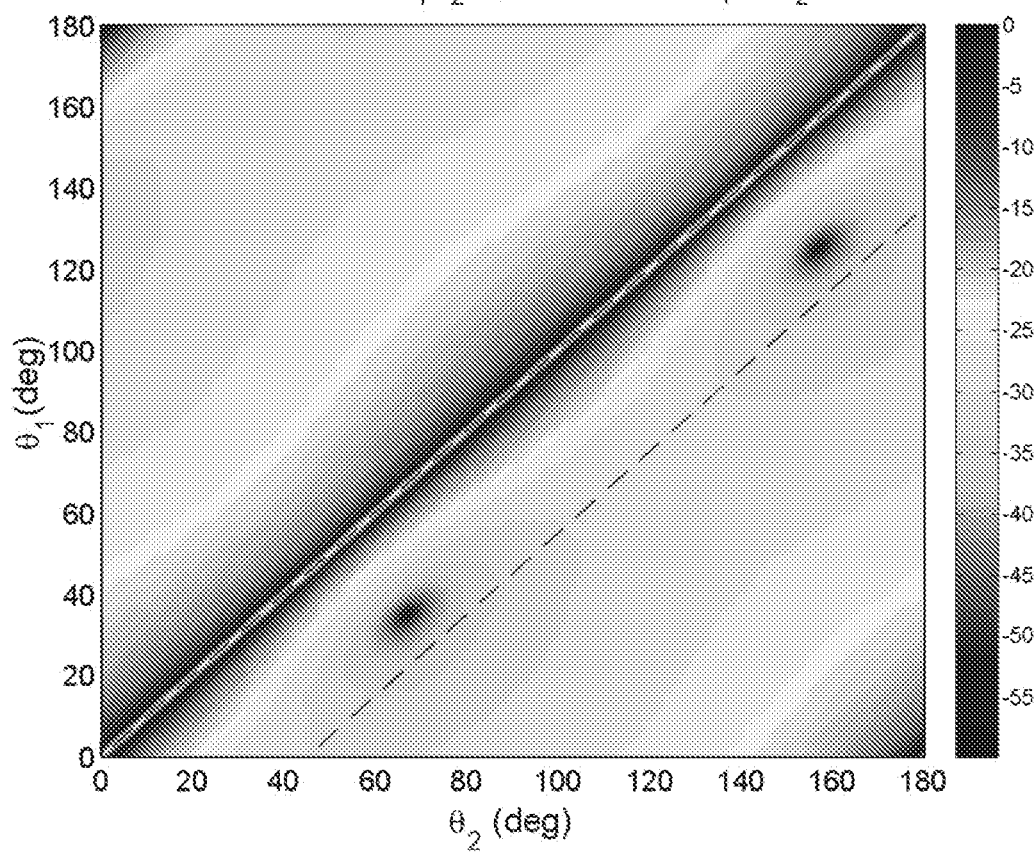
FIG. 13 illustrates a two-dimensional cost function of the four-component non-orthogonal LWD waveform rotation for the example of FIGS. 12A, 12B and 12C.

FIG. 13 shows the two-dimensional cost function (Block 815 of FIG. 8) for the synthetic example of FIGS. 12A and 12B. The two dashed lines represent the constraints for the upper and lower limit of the angle difference between the D1 and D2 firing directions. The estimated rotation angles are ($\theta_1$=34.4°, $\theta_2$=66.7) within the two dashed lines (the constraints).

Figure 14C:
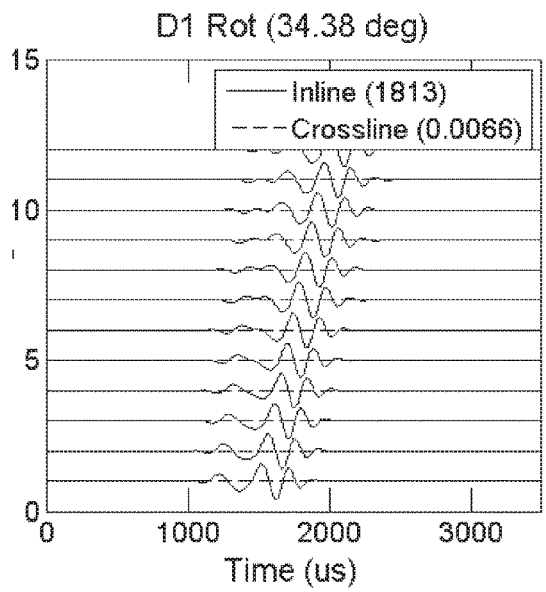
FIG. 14C illustrates the slowness dispersions of the rotated time-domain waveforms of FIGS. 14A and 14B in the horizontal section of the fast TIV formation.
Figure 14C:
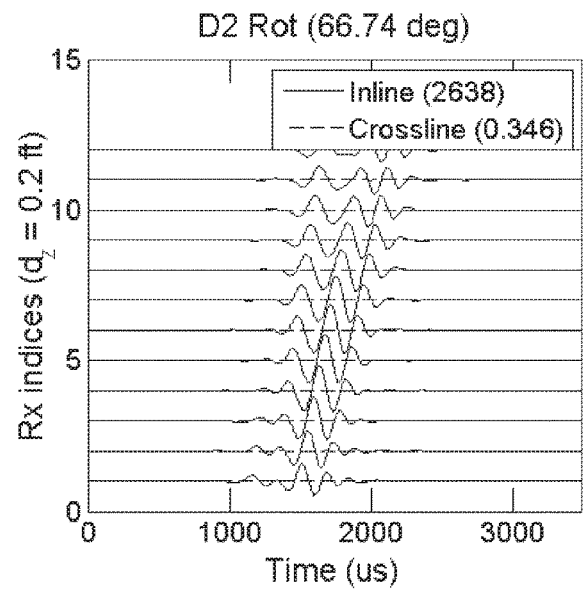
Figure 14C:
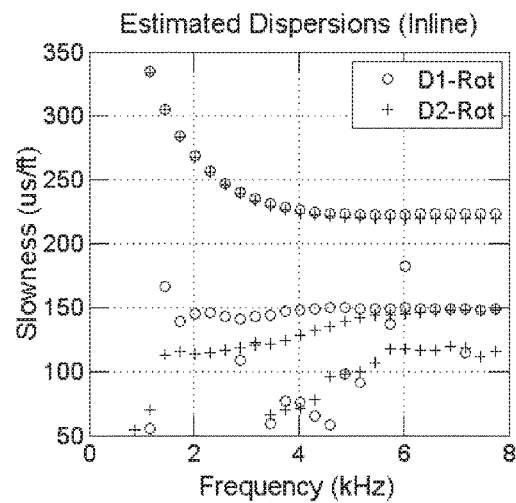

FIGS. 14A and 14B show the rotated inline and crossline array waveforms for the D1 and D2 dipole firings of FIGS. 12A and 12B. Note that the crossline energy of the rotated array waveforms is significantly minimized and the inline array waveforms display the fast and slow flexural modes. FIG. 14C shows the corresponding slowness dispersions. Note that the TKO results on the rotated inline array waveforms recover the formation flexural dispersions splitting at frequencies below 4 kHz.

Figure 15A:
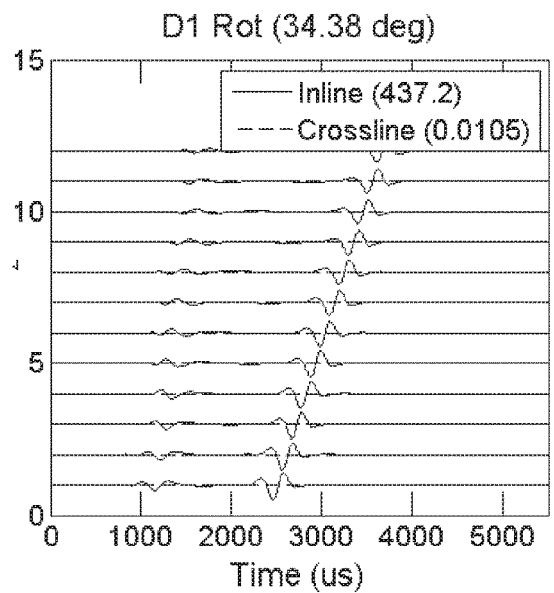
FIGS. 15A and 15B illustrate rotated time-domain waveforms arising from non-orthogonal D1 and D2 firings, respectively, from a dipole source in the horizontal section of a slow TIV formation.
Figure 15B:
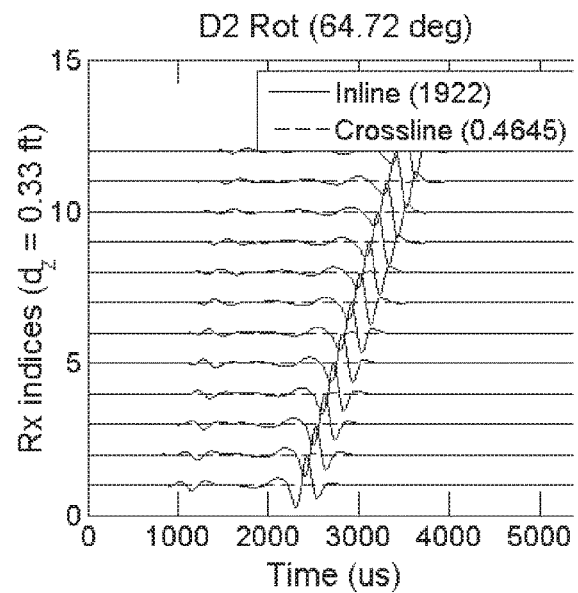
Figure 15C:
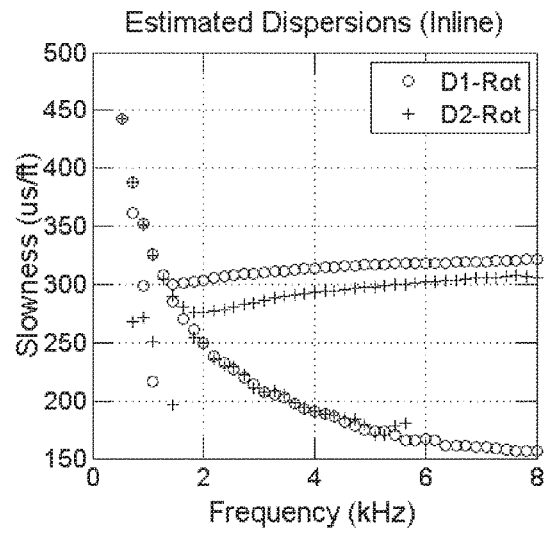
FIG. 15C illustrates the slowness dispersions of the rotated time-domain waveforms of FIGS. 15A and 15B in the horizontal section of the slow TIV formation.

FIGS. 15A and 15B shows the rotated synthesized inline and crossline array waveforms for D1 and D2 dipole firings in the horizontal section of a slow TIV formation. FIG. 15C shows the corresponding slowness dispersions. The TKO results in FIG. 15C show the coupled collar-flexural dispersions corresponding to the inline waveforms from the rotated D1 and D2. The flexural splitting at high frequencies is clearly observed. In this case, the fast and slow shear slownesses can be inverted from the fast and slow flexural dispersions using a model-based workflow as described in U.S. patent application Ser. No. 15/331,946, filed on Oct. 24, 2016, entitled "Determining Shear Slowness from Dipole Source-based Measurements Acquired by a Logging-While-Drilling Acoustic Measurement Tool."

Note that the time-domain workflow as discussed above is computationally efficient. However, its performance may be affected by the strong noise level and the tool eccentering effect in the LWD operation. Moreover, its performance can be affected by mismatch in the source-signatures of the D1 and D2 dipole firings. Thus, a complementary frequency-domain workflow is described below that is intended to relax the limitations of the time-domain workflow.

Frequency-Domain Workflow

Figure 16:
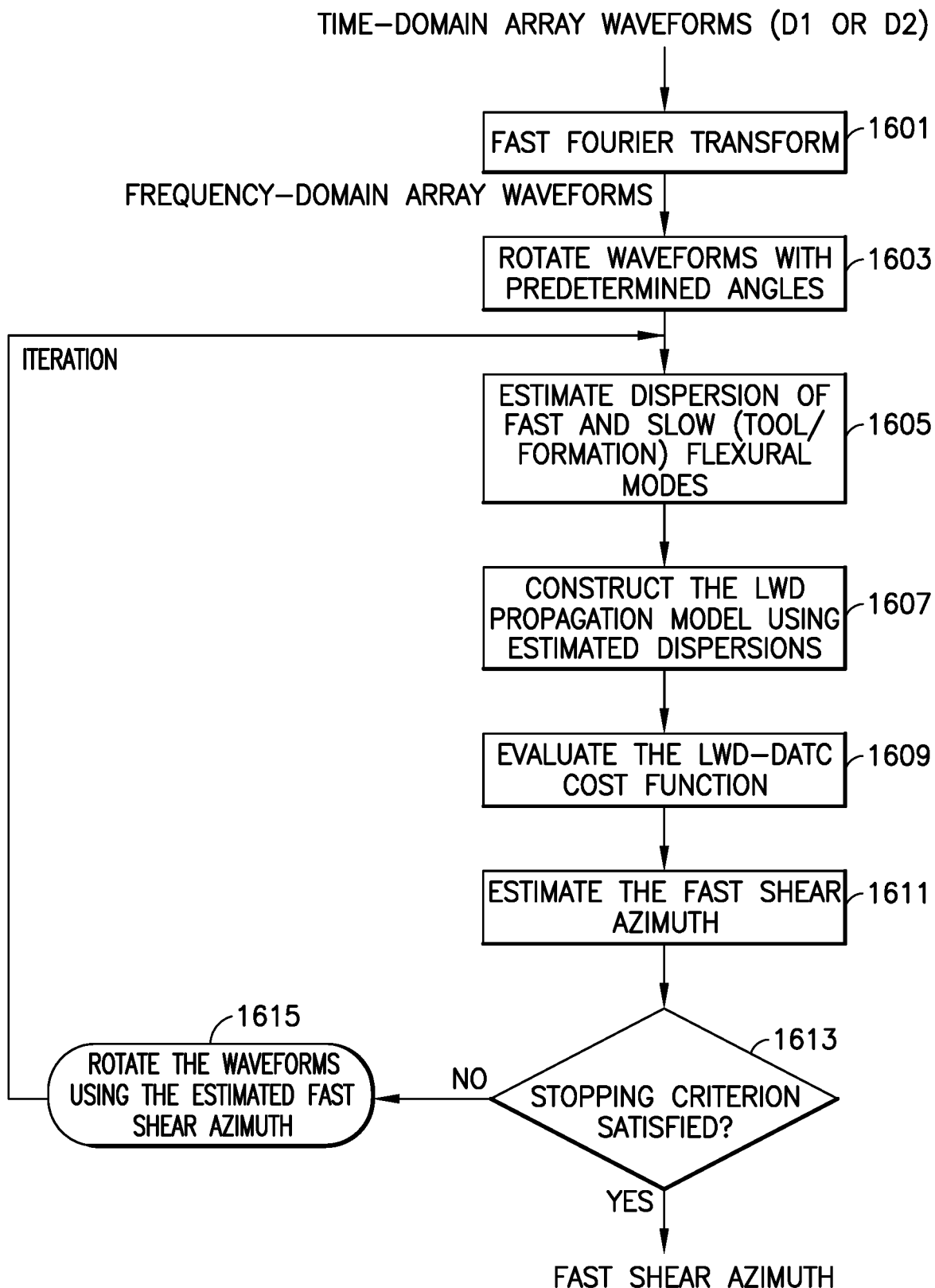
FIG. 16 is a flowchart illustrating a frequency-domain workflow according to an embodiment of the subject disclosure.

An embodiment of the second workflow that employs a frequency domain LWD multiple-component waveform rotation scheme is summarized in the flow chart of FIG. 16. The embodiment follows the geometry of the D1 and D2 dipole firing and the inline and crossline waveforms received by the receiver array described above with respect to FIGS. 5A and 5B. The frequency-domain workflow, referred to herein as the LWD-DATC workflow, takes into account the presence of drill collar and its associated collar-flexural mode in the waveforms, and outputs a parameter value that represents the Fast Shear Azimuth (FSA) direction of the formation. Compared with the time-domain workflow discussed above, the LWD-DATC workflow is more robust to the presence of noise and any tool eccentering that might be there (insofar as the dispersion is less affected). Furthermore, it is based on processing inline and crossline waveforms generated by a single directional dipole firing. This alleviates the requirement of dipole source matching.

The frequency-domain workflow begins in block 1601 where a fast Fourier transform is applied to the time domain inline and crossline array waveforms of the acoustic energy arising from the either the D1 or D2 LWD dipole firing as received by the receivers of the receiver array. As an optional part of block 1601, the inline and crossline array waveforms can be filtered to remove unwanted noise components. Such filtering can be carried out in one or more domains, such as in the time domain (e.g., time window processing), frequency domain (e.g., bandpass filtering), the slowness domain (e.g., semblance, Nth-root stacking processing), and in the time-frequency domain (using wavelets or other time-frequency representations).

The frequency-domain inline and crossline array waveforms output from block 1601 can be represented in a data vector/matrix form. For example, the frequency-domain inline and crossline array waveforms corresponding to the one dipole firing (D1, for instance) can be represented by a two-component data vector/matrix $u_{D1}$ as follows:

$$u_{D1}(\omega, z_m) = \begin{bmatrix} u_{D1IN}(\omega, z_m) \\ u_{D1OF}(\omega, z_m) \end{bmatrix}, \qquad \text{Eqn. (14)}$$

where $\omega$ is angular frequency.

The two-component data vector/matrix $u_{D1}$ can be expressed as follows:

$$\begin{aligned} u_{D1}(\omega, z_m) &= \begin{bmatrix} u_{D1IN}(\omega, z_m) \\ u_{D1OF}(\omega, z_m) \end{bmatrix} \\ &= \begin{bmatrix} \cos\theta & -\sin\theta \\ \sin\theta & \cos\theta \end{bmatrix} \begin{bmatrix} s(\omega)g_f(\omega, z_m) & 0 \\ 0 & s(\omega)g_s(\omega, z_m) \end{bmatrix} \begin{bmatrix} \cos\theta & \sin\theta \\ -\sin\theta & \cos\theta \end{bmatrix} \begin{bmatrix} 1 \\ 0 \end{bmatrix} \\ &\triangleq R(\theta)D(\omega, z_m)R^T(\theta)S \end{aligned} \qquad \text{Eqn. (15)}$$

This two-component data vector/matrix $u_{D1}$ is a simple transformation of the time-domain data vector of Eqn. (2) into the frequency domain.

Figure 17:
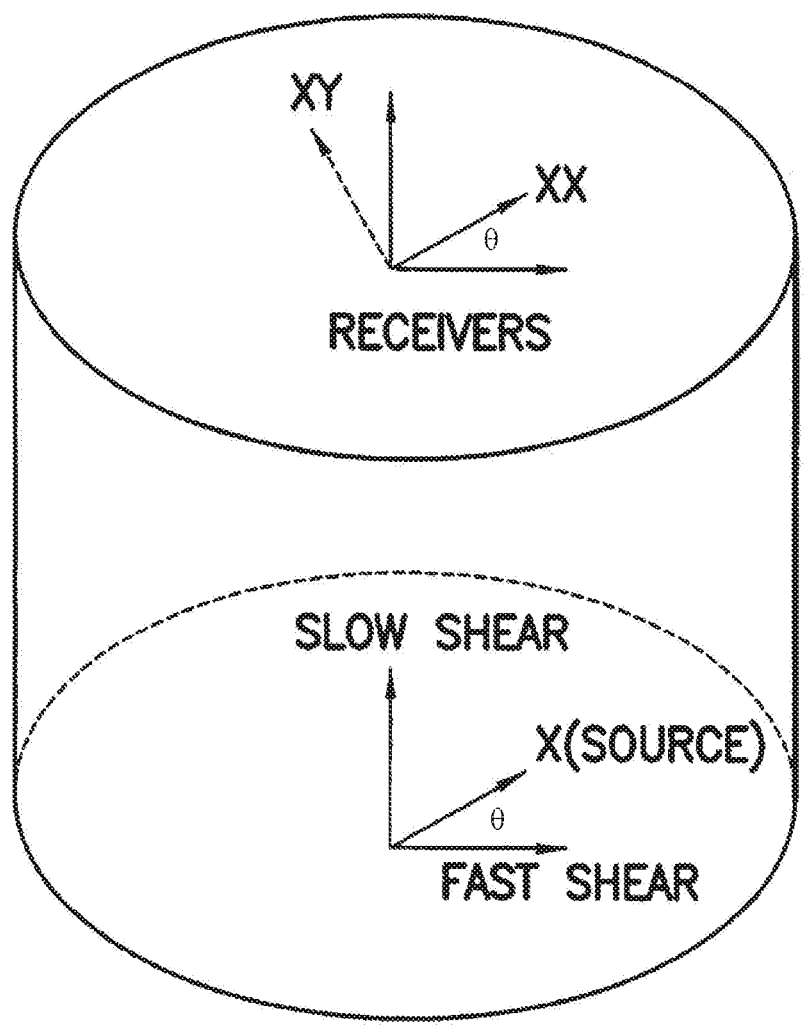
FIG. 17 is a schematic diagram illustrating shear wave splitting arising from a dipole transmitter in anisotropic formations and principal polarization directions.

In order to model the propogation of the pressure field associated with the fast and slow flexural waves, consider a dipole transmitter oriented at an angle $\theta$ with respect to the fast shear direction as shown in FIG. 17. The dipose transmitter waveform can be decomposed into two virtual sources directed along the fast and slow shear directions. The fast and slow flexural waves with corresponding polarization directions propogate along the borehole in accordance with the fast and slow dispersions. The inline array waveforms $U_{XX}$ and the crossline array waveforms $U_{XY}$ contain contributions from both the fast and slow flexural waves. The model representation of the inline and crossline array waveforms are denoted by $U_{XX}$ and $U_{XY}$, respectively.

The model representation of the inline and crossline array waveforms $U_{XX}$ and $U_{XY}$ take the following form:

$$U_{XX}=S_X \cos^2\theta g_f + S_X \sin^2\theta g_s,$$

$$U_{XY}=S_X \sin\theta \cos\theta g_f + S_X \sin\theta \cos\theta g_s, \qquad \text{Eqn. (16)}$$

where $S_X$ is the source signature for the dipole transmitter aligned along the X-direction that makes the angle $\theta$ with respect to the fast shear direction.

The eigenfunctions for the pressure field associated with the fast and slow flexural waves are given as:

$$g_f(\omega, z_m) = -\rho_m \omega^2 \cos\varphi \zeta(k_r^f, k_z^f, r)$$

$$g_s(\omega, z_m) = -\rho_m \omega^2 \cos\varphi \zeta(k_r^s, k_r^s, r) \qquad \text{Eqn. (17)}$$

where $\rho_m$ is the mud density, r and $\varphi$ are the radial and azimuthal coordinates, respectively of a given receiver, $k_r$ and $k_z$ are the radial and axial wavenumbers, respectively, for the fast and slow flexural waves (denoted by super-script f and s) with the following association $$(k_r^s)^2 = \frac{\omega^2}{v_m^2} - (k_z^s)^2 \qquad \text{Eqn. (18)}$$

$$(k_r^f)^2 = \frac{\omega^2}{v_m^2} - (k_z^f)^2$$

with $v_m$ denoting the mud compressional velocity.

Note that a function $\zeta$ can be used to represent the difference between the LWD acoustic measurement tool and wireline acoustic measurement tool. In the wireline acoustic measurement tool, the tool flexural mode is designed to be significantly slower than the formation flexural modes encountered in logging conditions and is moreover attenuated due to the presence of an isolation section between the dipole transmitter and the receivers. Therefore, the formation flexural mode is the dominant one with no interference from the tool flexural mode. In this case, the function $\zeta$ is given as:

$$\zeta(k_r^f, k_z^f, r) = J_1(k_r^f r) A\, e^{jk_z^f z_m},$$

$$\zeta(k_r^s, k_z^s, r) = J_1(k_r^f r) A\, e^{jk_z^s z_m} \qquad \text{Eqn. (19)}$$

where $J_1$ is the Bessel function of first kind, and

A is an amplitude coefficient of the Bessel function common to both fast and slow flexural eigenfunctions and obtained from the continuity condition at the borehole surface for the wireline propagation mode.

The Bessel function $J_1$ accounts for the formation flexural mode and is described in the following references: i) B. K. Sinha and X. Huang, "Dipole Anisotropy from Two-Component Acquisition: Validation against synthetic data," Schlumberger-Doll Research Note, 1999; ii) B. K. Sinha, S. Bose and X. Huang, "Determination of dipole shear anisotropy of earth formations", U.S. Pat. No. 6,718,266 B 1, 2002; and iii) S. Bose, B. K. Sinha, S. Sunaga, T. Endo and H. P. Valero, "Anisotropy processing without matched cross-dipole transmitters", 75th Ann. Internat. Mtg., Soc. Expl. Geophys., Expanded Abstracts, 2007.

In the LWD acoustic measurement tool there is direct propagation of the strong drill-collar flexural wave. To account for the existence of the rotating tool pipe and the fact that the receivers are located in the annulus just outside of the rotating tool pipe and inside the formation, the function is modified for either a slow formation or a fast formation to include Bessel functions of the second kind in addition to those of the first kind.

In a slow formation, the function $\zeta$ is modified as follows:

$$\zeta(k_r^f, k_z^f, r) = [J_1(k_r^f r)A + Y_1(k_r^f r)B]e^{jk_z^f z_m},$$

$$\zeta(k_r^s, k_z^s, r) = [J_1(k_r^s r)A + Y_1(k_r^s r)B]e^{jk_z^s z_m} \qquad \text{Eqn. (20)}$$

where $J_1$ is the Bessel function of the first kind, $Y_1$ is the Bessel function of the second kind, $k_r^f$ and $k_r^s$ are the radial wavenumbers for the fast and slow coupled tool-formation flexural waves, and A and B are amplitude coefficients for Bessel functions of the first and second kind respectively obtained from the continuity conditions at the borehole and tool pipe surface for the LWD propagation mode in the slow formation.

Note that the $Y_1$ Bessel function of Eqn. (20) is needed to properly account for propagation of the drill-collar flexural wave in the annulus between the rotating tool and the formation in this slow formation case.

In the case of a slow formation, Eqn. (15) can be rewritten with the following expression for the two-component data vector/matrix $u_{D1}$:

$$u_{D1}(\omega, z_m) = \begin{bmatrix} u_{D1IN}(\omega, z_m) \\ u_{D1OF}(\omega, z_m) \end{bmatrix} = -\rho_m \omega^2 s(\omega) \cos \qquad \text{Eqn. (21)}$$

$$\varphi \left( A \begin{bmatrix} J_f(z_m) & 0 & J_s(z_m) \\ 0 & J_s(z_m) - J_f(z_m) & 0 \end{bmatrix} + \right.$$

$$\left. B \begin{bmatrix} Y_f(z_m) & 0 & Y_s(z_m) \\ 0 & Y_s(z_m) - Y_f(z_m) & 0 \end{bmatrix} \right)$$

$$\begin{bmatrix} \cos^2 \theta \\ \sin \theta \cos \theta \\ \sin^2 \theta \end{bmatrix}$$

$$J_f(z_m) = J_1(k_r^f r)e^{jk_z^f z_m},$$

$$J_s(z_m) = J_1(k_r^s r)e^{jk_z^s z_m},$$

where $$Y_f(z_m) = Y_1(k_r^f r)e^{jk_z^f z_m}, \text{ and}$$

$$Y_s(z_m) = Y_1(k_r^s r)e^{jk_z^s z_m}, \qquad \text{Eqn. (22)}$$

The array waveforms for all of the receivers can be combined into two long vectors as follows:

$$u_{D1IN}(\omega) = \begin{bmatrix} u_{D1IN}(\omega, z_1) \\ u_{D1IN}(\omega, z_2) \\ \vdots \\ u_{D1IN}(\omega, z_M) \end{bmatrix}, u_{D1OF}(\omega) = \begin{bmatrix} u_{D1OF}(\omega, z_1) \\ u_{D1OF}(\omega, z_2) \\ \vdots \\ u_{D1OF}(\omega, z_M) \end{bmatrix}. \qquad \text{Eqn. (23)}$$

The vectors of Eqn. (23) can be rewritten into a matrix form as follows:

$$u_{D1}(\omega) = \begin{bmatrix} u_{D1IN}(\omega) \\ u_{D1OF}(\omega) \end{bmatrix} \qquad \text{Eqn. (24)}$$

$$= \alpha(\omega)\left\{ A\begin{bmatrix} J_f & 0 & J_s \\ 0 & J_s - J_f & 0 \end{bmatrix} + B\begin{bmatrix} Y_f & 0 & Y_s \\ 0 & Y_s - Y_f & 0 \end{bmatrix} \right\} v(\theta)$$

$$= \alpha(\omega)(AJ(\omega) + BY(\omega))v(\theta)$$

where $$\alpha(\omega) = -\rho_m \omega^2 s(\omega) \cos\varphi, \qquad \text{Eqn. (25)}$$

$$v(\theta) = \begin{bmatrix} \cos^2\theta \\ \sin\theta\cos\theta \\ \sin^2\theta \end{bmatrix},$$

$$J_f = \begin{bmatrix} J_1(k_r^f r)e^{jk_z^f z_1} \\ J_1(k_r^f r)e^{jk_z^f z_2} \\ \vdots \\ J_1(k_r^f r)e^{jk_z^f z_M} \end{bmatrix},$$

$$J_s = \begin{bmatrix} J_1(k_r^s r)e^{jk_z^s z_1} \\ J_1(k_r^s r)e^{jk_z^s z_2} \\ \vdots \\ J_1(k_r^s r)e^{jk_z^s z_M} \end{bmatrix},$$

$$Y_f = \begin{bmatrix} Y_1(k_r^f r)e^{jk_z^f z_1} \\ Y_1(k_r^f r)e^{jk_z^f z_2} \\ \vdots \\ Y_1(k_r^f r)e^{jk_z^f z_M} \end{bmatrix}, \text{ and}$$

$$Y_s = \begin{bmatrix} Y_1(k_r^s r)e^{jk_z^s z_1} \\ Y_1(k_r^s r)e^{jk_z^s z_2} \\ \vdots \\ Y_1(k_r^s r)e^{jk_z^s z_M} \end{bmatrix}.$$

The matrices of Eqns. (24) and (25) can be rewritten into a simplified form as follows:

$$u_{D1}(\omega) = \begin{bmatrix} u_{D1IN}(\omega) \\ u_{D1OF}(\omega) \end{bmatrix} \qquad \text{Eqn. (26)}$$

$$= [J(\omega)v(\theta) \ Y(\omega)v(\theta)] \begin{bmatrix} \alpha(\omega)A \\ \alpha(\omega)B \end{bmatrix}$$

$$= D(\omega, \theta)b(\omega)$$

In practice, the data vector/matrix $u_{D1}$ of Eqn. (26) is usually contaminated by noise as follows:

$$u_{D1}(\omega) = D(\omega,\theta)b(\omega) + n(\omega). \qquad \text{Eqn. (27)}$$

To find a solution of the rotation angle $\theta$ in a slow formation, an LWD-DATC cost function can be constructed from the data vector/matrix $u_{D1}$ of Eqn. (26). Note that the data vector/matrix $u_{D1}$ of Eqn. (26) is produced from the model of propogation of the pressure field associated with the fast and slow flexural waves of Eqns. (16)-(26). The LWD-DATC cost function involves the frequency-domain waveforms across the receivers of the array and multiple frequency points as follows:

$$\hat{\theta} = \arg\max_{\theta} \sum_{\omega \in \Omega} u_{D1}^H(\omega) P_{D(\omega,\theta)} u_{D1}(\omega) \qquad \text{Eqn. (28)}$$

where $\Omega$ is the set of selected frequency points, $P_{D(\omega,\theta)}$ is the projection matrix onto the subspace of the signal matrix $D(\omega, \theta)$ of the form $P_{D(\omega,\theta)} = D(\omega, \theta) (D^H(\omega, \theta))^{-1} D^H(\omega, \theta)$, and $$D(\omega,\theta) \text{ is a rank-two matrix of the form } D(\omega,\theta) = [J(\omega)v(\theta) Y(\omega)v(\theta)] \text{ for the slow formation.} \qquad \text{Eqn. (29)}$$

With this cost function, the rotation angle $\theta$ is estimated as the parameter that maximizes the total energy projected onto the signal subspace defined by the two Bessel functions $J(\omega)$ and $Y(\omega)$ along the fast and slow flexural dispersions. The set of the selected frequency points $\Omega$ of the cost function is based on estimated dispersion of the fast and slow (tool/formation) flexural modes.

In a fast formation, the function $\zeta$ is modified to describe the coupled tool and formation flexural modes as follows:

$$\zeta(k_r^f, k_z^f, r) = [J_1(k_r^{f,F}r)A_F + Y_1(k_r^{f,F}r)B_F]e^{jk_z^{f,F}z_m} + [J_1(k_r^{f,T}r)A_T + Y_1(k_r^{f,T}r)B_T]e^{jk_z^{f,T}z_m},$$

$$(k_r^f, k_z^f, r) = [J_1(k_r^{f,F}r)A_F + Y_1(k_r^{f,F}r)B_F]e^{jk_z^{f,F}z_m} + [J_1(k_r^{f,T}r)A_T + Y_1(k_r^{f,T}r)B_T]e^{jk_z^{f,T}z_m}, \qquad \text{Eqn. (30)}$$

where $J_1$ is the Bessel function of the first kind, $Y_1$ is the Bessel function of the second kind, $k_r^{j,F}$ and $k_r^{s,F}$ are the radial wavenumbers for the fast and slow formation flexural waves, $k_r^{f,T}$ and $k_{r,s,T}$ are the radial wavenumbers for the fast and slow tool flexural waves; $A_F$ and $B_F$ are the amplitude coefficients for the Bessel function of the first and second kind respectively, representing the LWD formation flexural propagation mode in the fast formation and obtained from the continuity conditions at the borehole and tool pipe interfaces; and $A_T$ and $B_T$ are similarly the amplitude coefficients for the Bessel function of the first and second kind respectively, representing the LWD tool flexural propagation mode in the fast formation and obtained from the continuity conditions at the borehole and tool pipe interfaces.

Note that in Eqn. (30) the $Y_1$ Bessel function of Eqn. (21) is used in a similar manner as described above with respect to Eqn. (20) to properly account for the propagation of the drill-collar flexural wave in the annulus between the rotating tool and the formation. It also accounts for the coupling between the rotating tool and the formation.

In the case of a fast formation, Eqn. (15) can be rewritten with the following expression of the two-component data vector/matrix $u_{D1}$:

$$u_{D1}(\omega) = \alpha(\omega)\left( \begin{array}{c} A_T\begin{bmatrix} J_f^T & 0 & J_s^T \\ 0 & J_s^T - J_f^T & 0 \end{bmatrix} + B_T\begin{bmatrix} Y_f^T & 0 & Y_s^T \\ 0 & Y_s^T - Y_f^T & 0 \end{bmatrix} \\ +A_F\begin{bmatrix} J_f^F & 0 & J_s^F \\ 0 & J_s^F - J_f^F & 0 \end{bmatrix} + B_F\begin{bmatrix} Y_f^F & 0 & Y_s^F \\ 0 & Y_s^F - Y_f^F & 0 \end{bmatrix} \end{array} \right) \quad \text{Eqn. (31)}$$

$$= \alpha(\omega)(A_T J_T(\omega) + B_T Y_T(\omega) + A_F J_f(\omega) + B_F Y_F(\omega))v(\theta)$$

where $$\alpha(\omega) = -\rho_m \omega^2 s(\omega) \cos \varphi \quad \text{Eqn. (32)}$$

$$v(\theta) = \begin{bmatrix} \cos^2 \theta \\ \sin \theta \cos \theta \\ \sin^2 \theta \end{bmatrix},$$

$$J_f^T = \begin{bmatrix} J_1(k_r^{f,T} r)e^{jk_z^{f,T} z_1} \\ J_1(k_r^{f,T} r)e^{jk_z^{f,T} z_2} \\ \vdots \\ J_1(k_r^{f,T} r)e^{jk_z^{f,T} z_M} \end{bmatrix},$$

$$J_s^T = \begin{bmatrix} J_1(k_r^{s,T} r)e^{jk_z^{s,T} z_1} \\ J_1(k_r^{s,T} r)e^{jk_z^{s,T} z_2} \\ \vdots \\ J_1(k_r^{s,T} r)e^{jk_z^{s,T} z_M} \end{bmatrix},$$

$$J_f^F = \begin{bmatrix} J_1(k_r^{f,F} r)e^{jk_z^{f,F} z_1} \\ J_1(k_r^{f,F} r)e^{jk_z^{f,F} z_2} \\ \vdots \\ J_1(k_r^{f,T} r)e^{jk_z^{s,F} z_M} \end{bmatrix},$$

$$Y_s^T = \begin{bmatrix} Y_1(k_r^{s,T} r)e^{jk_z^{s,T} z_1} \\ Y_1(k_r^{s,T} r)e^{jk_z^{s,T} z_2} \\ \vdots \\ Y_1(k_r^{s,T} r)e^{jk_z^{s,T} z_M} \end{bmatrix},$$

$$Y_f^F = \begin{bmatrix} Y_1(k_r^{f,F} r)e^{jk_z^{f,F} z_1} \\ Y_1(k_r^{f,F} r)e^{jk_z^{f,F} z_2} \\ \vdots \\ Y_1(k_r^{f,F} r)e^{jk_z^{f,F} z_M} \end{bmatrix},$$

$$Y_s^F = \begin{bmatrix} Y_1(k_r^{s,F} r)e^{jk_z^{s,F} z_1} \\ Y_1(k_r^{s,T} r)e^{jk_z^{s,F} z_2} \\ \vdots \\ Y_1(k_r^{s,T} r)e^{jk_z^{s,F} z_M} \end{bmatrix}.$$

The matrices of Eqns. (31) and (32) can be rewritten into a simplified form as follows:

$$u_{D1}(\omega) = \begin{bmatrix} u_{D1IN}(\omega) \\ u_{D1OF}(\omega) \end{bmatrix}$$

$$= [J_T(\omega)v(\theta)\ Y_T(\omega)v(\theta)\ J_F(\omega)v(\theta)\ Y_F(\omega)v(\theta)] \begin{bmatrix} \alpha(\omega)A_T \\ \alpha(\omega)B_T \\ \alpha(\omega)A_F \\ \alpha(\omega)B_F \end{bmatrix}$$

$$= D(\omega,\theta)b(\omega)$$

Eqn. (33)

This form consists of the same expression as in the case of the slow formation (Eqn. (26)), except that the rank of the matrix $D(\omega, \theta)$ increases from 2 to 4 due to the separation of the drill-collar and formation flexural modes.

In practice, the data vector/matrix $u_{D1}$ of Eqn. (33) is usually contaminated by noise as follows:

$$u_{D1}(\omega) = D(\omega,\theta)b(\omega) + n(\omega)$$ Eqn. (34)

To find a solution of the rotation angle θ in a fast formation, an LWD-DATC cost function can be constructed from the data vector/matrix $u_{D1}$ of Eqn. (33). Note that the data vector/matrix $u_{D1}$ of Eqn. (33) is produced from the model of propogation of the pressure field associated with the fast and slow flexural waves of Eqns. (29)-(33). The LWD-DATC cost function involves the frequency-domain waveforms across all of the receivers of the array and multiple frequency points as follows:

$$\hat{\theta} = \arg\max_\theta \sum_{\omega \in \Omega} u_{D1}^H(\omega) P_{D(\omega,\theta)} u_{D1}(\omega)$$ Eqn. (35)

where, again, $P_{D(\omega,\theta)}$ is the projection matrix onto the subspace of the matrix
$D(\omega, \theta)$, $P_{D(\omega,\theta)} = D(\omega, \theta)(D^H(\omega, \theta)D(\omega, \theta))^{-1} D^H(\omega, \theta)$, and
$D(\omega, \theta)$ is a rank-four matrix given as $$D(\omega,\theta) = [J_T(\omega)v(\theta)\ Y_T(\omega)v(\theta)\ J_F(\omega)v(\theta)\ Y_F(\omega)v(\theta)]$$ Eqn. (36)

In order to construct the LWD-DATC cost function for a slow formation or a fast formation, the frequency-domain workflow rotates the data vectors output from block 1601 (e.g., the two-component data vectors of Eqn. (15)) with a set of one or more predetermined rotation angles in block 1603. If the data vectors are rotated by a set of two or more predetermined rotation angles, the rotated data vectors (which are rotated by the predetermined rotation angle) that shows the largest flexural dispersion splitting are selected for output to block 1605. Note that the set of one or more predetermined rotation angles can be configured to cover the fast shear direction based on the fast shear directions acquired from other depths in the formation.

In block 1605, the rotated data vectors output from block 1603 are used to estimate the dispersion of fast and slow (tool/formation) flexural modes arising from the D1 or D2 LWD dipole firing. Such operations can employ a variety of methods known in the art for such estimation. A number of methods are described in i) U.S. patent application Ser. No. 15/331,946, filed on Oct. 24, 2016, entitled "Determining Shear Slowness from Dipole Source-based Measurements Acquired by a Logging-While-Drilling Acoustic Measurement Tool;" ii) Ekstrom, M. P., "Dispersion estimation from borehole acoustic arrays using a modified matrix pencil algorithm," 29th Asilomar Conf. Signals, Syst., Comput., Pacific Grove, Calif., pp. 449-453, Oct. 31, 1995; iii) Tang, X. M., Li, C., and Patterson, D., "A curve-fitting method for analyzing dispersion characteristics of guided elastic waves," The 79th SEG Annual Meeting, Houston, Tex., 25-30 Oct. 25-30, 2009, pp. 461-465; iv) Wang, C., "Sonic well logging methods and apparatus utilizing parametric inversion dispersive wave processing," U.S. Pat. No. 7,120,541; v) Aeron, S., Bose, S. and Valero, H.-P., "Automatic Dispersion Extraction of Multiple Time-Overlapped Acoustic Signals," U.S. Pat. No. 8,339,897; vi) Wang, P. and Bose, S., "Broadband dispersion extraction of borehole acoustic modes via sparse Bayesian learning: 5th IEEE International Workshop on Computational Advances in Multi-Sensor Adaptive Processing, Saint Martine, Dec. 15-18, 2013, pp. 268-271; and vii) Wang, P. and Bose, S., "Apparatus for Mode Extraction Using Multiple Frequencies," PCT Publication No. PCT/US14/049703; herein incorporated by reference in their entireties. The estimated dispersions for each of the modes can be represented in terms of the phase slowness, or equivalently, the axial wavenumbers, as a function of frequency, which are then used as described below.

In block 1607, the rotated data vectors output from block 1603 are used to define a propogation model of the pressure field associated with the fast and slow flexural waves arising from the D1 or D2 LWD dipole firing for the appropriate fast or slow formation. In one embodiment, for a slow formation, the rotated data vectors output from block 1603 are used to define the frequency domain waveforms $u_{D1IN}(\omega)$ and $u_{D1OF}(\omega)$ for the receivers of the receiver array with respect to the propagation model of Eqns. (15)-(26) as described above. The estimated dispersion of the fast and slow (tool/formation) flexural modes as computed in block 1605 can be used to define the propagation model for the slow formation. For example, the wavenumbers of the fast and slow (tool/formation) flexural modes as computed in block 1605 can be used to compute the matrix $D(\omega, \theta)$ of Eqn. (29) via the matrices $J_f, J_s, Y_f, Y_s$ of Eqn. (25). In another embodiment, for a fast formation, the rotated data vectors output from block 1603 are used to define the frequency domain waveforms $u_{D1IN}(\omega)$ and $u_{D1OF}(\omega)$ for all of the receivers of the receiver array with respect to the propagation model of of Eqns. (29)-(32) as described above. The estimated dispersion of the fast and slow (tool/formation) flexural modes as computed in block 1605 can be used to define the propogation model for the fast formation. For example, the wavenumbers of the fast and slow (tool/formation) flexural modes as computed in block 1605 can be used to compute the matrix $D(\omega, \theta)$ of Eqn. (36) via the matrices $J_f^T, J_s^T, J_f^F, Y_s^T, Y_f^F$, and $Y_s^F$ of Eqn. (32).

In block 1609, the LWD-DATC cost function (e.g., Eqn. (28) for the slow formation or Eqn. (34) for the fast formation) is constructed based on the propogation model defined in block 1607. The set of the selected frequency points Ω of the LWD-DATC cost function is based on estimated dispersion of the fast and slow (tool/formation) flexural modes computed in block 1605. In particular, the frequency points are selected to lie in a frequency band where we have sufficiently large separation between the fast and slow flexural (formation/tool) dispersions. In the fast formation case, the selected frequency points can lie in the low frequency range where the formation flexural dispersions normally show large separation. In the slow formation case, the selected frequency points can lie in the relatively high frequency range where the dispersion separation is larger. The LWD-DATC cost function is then evaluated by computer-implemented methods to determine the angle θ where the total energy projected onto the signal subspace defined by the two Bessel functions J(ω) and Y(ω) along the fast and slow flexural dispersions is maximized.

In block 1611, the angle θ obtained by the maximized cost function in block 1609 can be used to estimate the fast shear direction of the formation as θ degrees away from the respective D1 or D2 dipole firing direction. In other words, the parameter value for the angle θ as obtained by the maximized cost function in block 1609 represents the fast shear direction of the formation. The slow shear direction of the formation can be calculated by an offset of 90° relative to the fast shear direction of the formation as is evident from FIGS. 5A and 5B.

In block 1613, the workflow evaluates a stopping criterion to determine if the stopping criterion is satisfied. There are a number of possible options for the choice of stopping criterion. One choice is to re-iterate the process once and see if the estimated fast shear azimuth is close enough to its estimate in the previous iteration. If the two estimates are close (subject to a threshold), then the workflow ends and outputs the estimated fast shear azimuth direction in the last iteration or the average value as the final estimate of the fast shear azimuth direction. If so (yes), the fast shear direction as determined in block 1611 is stored and output as the fast shear azimuth direction of the slow formation. If not (no), the data vectors output from block 1601 (e.g., the two-component data vectors of Eqn. (15)) can be rotated at one or more predetermined rotation angles in block 1615 in a manner similar to block 1603 and the operations of blocks 1605 to 1613 can be repeated for one or more additional iterations until the stopping criterion is satisfied.

To evaluate the effectiveness of the LWD-DATC cost function, first consider a slow formation, which is the same case as shown in FIGS. 15A, 15B and 15C. To construct the LWD-DATC cost function for the slow formation, the wavenumbers of the fast and slow collar-formation flexural modes are used as inputs to compute the matrix D(ω, θ) of Eqn. (29) via the matrices $J_f$, $J_s$, $Y_f$, $Y_s$ of Eqn. (25). To validate the proposed frequency-domain workflow, true model wavenumbers can be used to construct the LWD-DATC cost function. In this case, the inline and crossline array waveforms arising from only the D1 firing are used. Specifically, the D1 firing direction is 45° away from the fast shear direction.

Figure 18A:
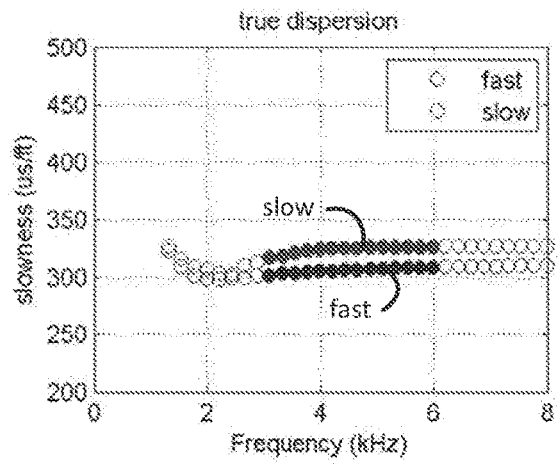
FIG. 18A illustrates an exemplary model slowness dispersion of the fast and slow coupled collar-formation flexural modes arising from a dipole firing which is 45° away from the fast shear direction in a slow formation. The solid dots between 3.5 and 6 kHz represents a band limited dispersion used in the frequency-domain workflow.
Figure 18B:
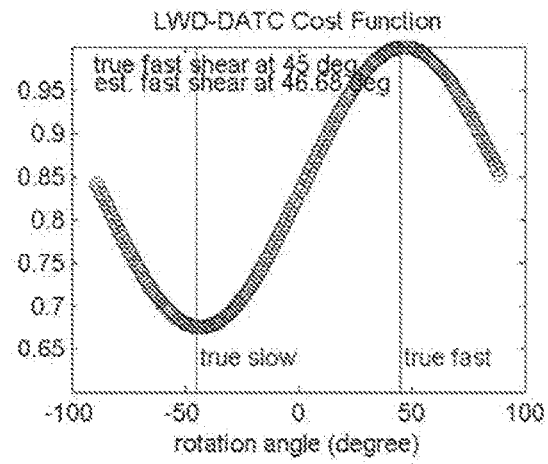
FIG. 18B shows an exemplary one-dimensional LWD-DATC cost function, which is constructed using raw inline and crossline waveforms between 3.5 and 6 kHz.

FIG. 18A shows the model slowness dispersion of the fast and slow coupled collar-formation flexural modes. The solid dots between 3.5 and 6 kHz represents a band limited dispersion used in the frequency-domain workflow. FIG. 18B shows the one-dimensional LWD-DATC cost function, which is constructed by using the inline and crossline waveforms between 3.5 and 6 kHz from a dipole firing which is 45° away from the fast shear direction. The maximum of the LWD-DATC cost function corresponds to the fast shear direction, whereas the minimum of the LWD-DATC cost function represents the slow shear direction. The difference between the maximum and minimum reflects the calculated difference between the fast and slow shear polarization directions. Note that the true model slowness dispersion of the fast and slow coupled collar-formation flexural modes between 3.5 and 6 kHz is used to construct the LWD-DATC cost function, which computes the projected total signal energy between 3.5 and 6 kHz. It is further seen in FIG. 18B that the maximum of the LWD-DATC cost function provides the fast shear direction at 46.68°, whereas the minimum yields the slow shear direction. The difference between the maximum and minimum reflects the difference between the fast and slow shear polarization directions.

Figure 19A:
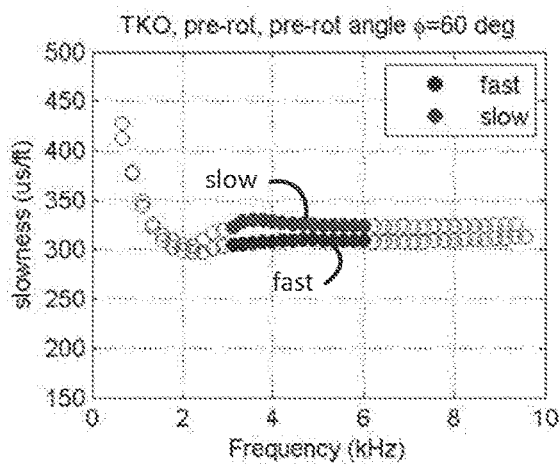
FIG. 19A shows two exemplary slowness dispersions of the fast and slow coupled collar-formation flexural modes arising from a dipole firing which is 45° away from the fast shear direction in a slow formation (same as FIG. 18A), where the slowness dispersions are extracted from pre-rotated inline and crossline waveforms with a pre-determined angle of 60°.
Figure 19B:
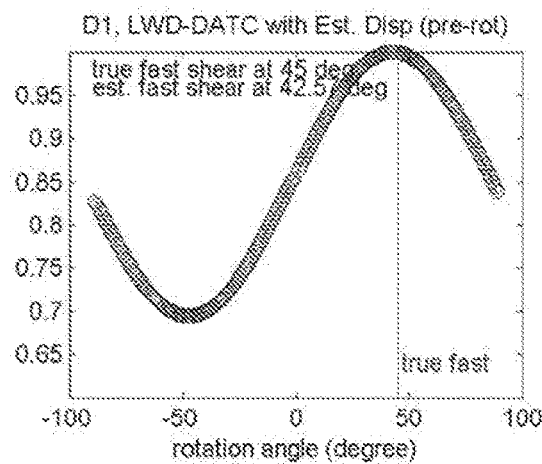
FIG. 19B shows an exemplary one-dimensional LWD-DATC cost function constructed from selected slowness dispersions (denoted as solid dots) for the fast and slow flexural modes of FIG. 19A.

In practice, the measured dispersion for the fast and slow flexural waves may not be known in advance. To address this issue, the inline and crossline array waveforms can be rotated by a set of pre-determined angles in block 1603. For instance, the inline and crossline array waveforms can be rotated by a set of three pre-determined angles [20°, 40°, 60°], and the pre-rotated waveforms showing the largest flexural dispersion splitting can be selected. Then, in block 1609, estimated flexural dispersions from the pre-rotated waveforms (block 1605) are used to construct the LWD-DATC cost function (block 1607). In an example shown in FIGS. 19A and 19B, two slowness dispersions of the fast and slow coupled collar-formation flexural modes are selected from the pre-rotated waveforms with a pre-determined angle of 60° to construct the LWD-DATC cost function. The selected slowness dispersions (denoted as solid dots) for the fast and slow flexural modes are used to construct and evaluate the LWD-DATC cost function shown in FIG. 19B. Note that the maximum of the LWD-DATC cost function is shifted to the left to 42.5° and this effect may be attributed to the pre-rotation. One may mitigate this effect by using multiple pre-determined angles with a finer step size.

Figure 20A:
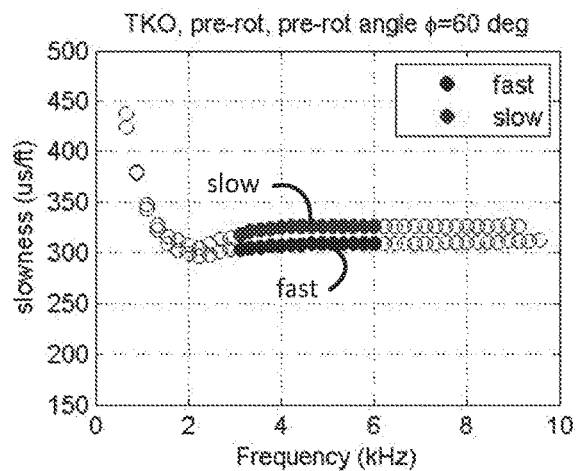
FIG. 20A shows two exemplary slowness dispersions of the fast and slow coupled collar-formation flexural modes arising from a dipole firing that is 67° away from the fast shear direction (different from FIGS. 18A and 19A) in a slow formation, where the slowness dispersions are extracted from pre-rotated inline and crossline waveforms with a pre-determined angle of 60°.
Figure 20B:
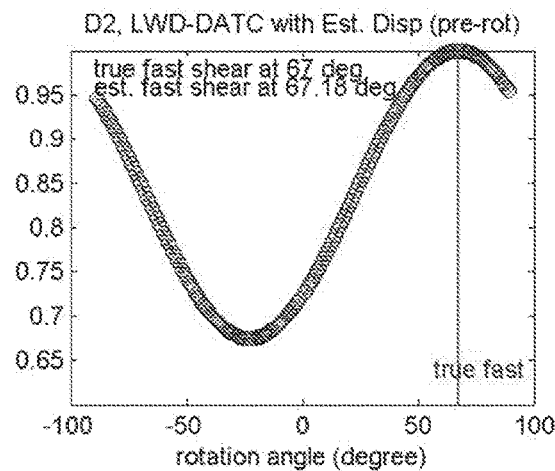
FIG. 20B shows an exemplary one-dimensional LWD-DATC cost function constructed from selected slowness dispersions (denoted as solid dots) for the fast and slow flexural modes of FIG. 20A.
Figure 20C:
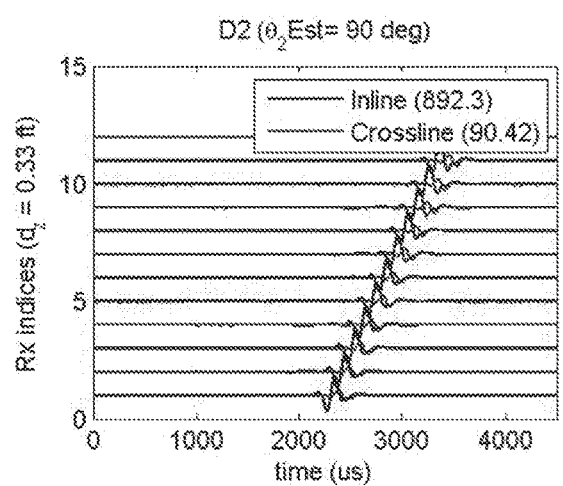
FIG. 20C shows rotated inline and crossline waveforms for the example of FIG. 20A when the inline receivers are parallel to the fast shear direction of the slow formation.

Consider another case with a D2 firing direction that is 67° away from the fast-shear direction in a slow formation. Again, the inline and crossline array waveforms can be rotated by a set of pre-determined angles in block 1603. For instance, the inline and crossline array waveforms can be rotated by a set of three pre-determined angles [20°, 40°, 60°], and the pre-rotated waveforms showing the largest flexural dispersion splitting can be selected. Then, in block 1609, estimated flexural dispersions from the pre-rotated waveforms (block 1605) are used to construct the LWD-DATC cost function (block 1607). In an example shown in FIGS. 20A, 20B and 20C, two slowness dispersions of the fast and slow coupled collar-formation flexural modes are selected from the pre-rotated waveforms with a pre-determined angle of 60° to construct the LWD-DATC cost function. The selected slowness dispersions (denoted as solid dots) for the fast and slow flexural modes are used to construct and evaluate the LWD-DATC cost function shown in FIG. 20B, which attains its maximum at 67.18°. The rotated inline and crossline waveforms are shown in FIG. 20C. Note that, the crossline energy is not minimized to zero as the LWD-DATC cost function does not minimize the crossline energy directly. Nevertheless, the crossline energy is relatively small when it is compared with the inline waveform energy.

Figure 21A:
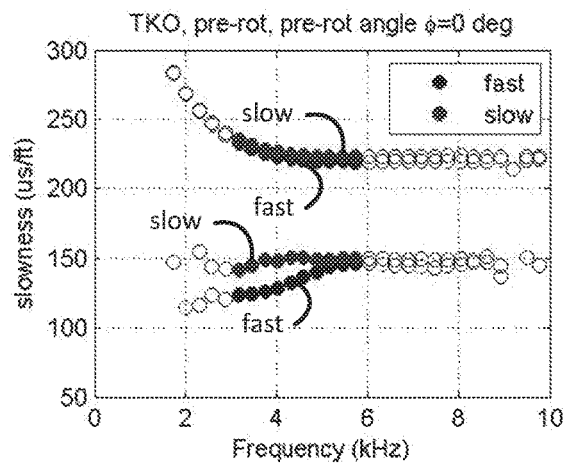
FIG. 21A shows two exemplary slowness dispersions of the fast and slow coupled collar-formation flexural modes arising from a dipole firing that is 85° away from the fast shear direction in a fast formation, where the slowness dispersions are extracted from raw (non-rotated) inline and crossline waveforms
Figure 21B:
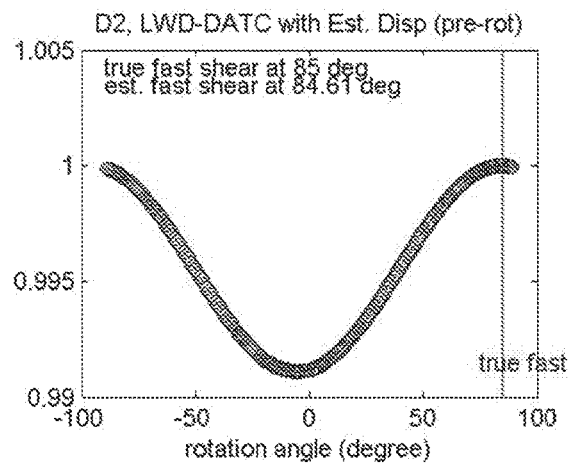
FIG. 21B shows an exemplary one-dimensional LWD-DATC cost function constructed from selected slowness dispersions (denoted as solid dots) for the fast and slow flexural modes of FIG. 21A.
Figure 21C:
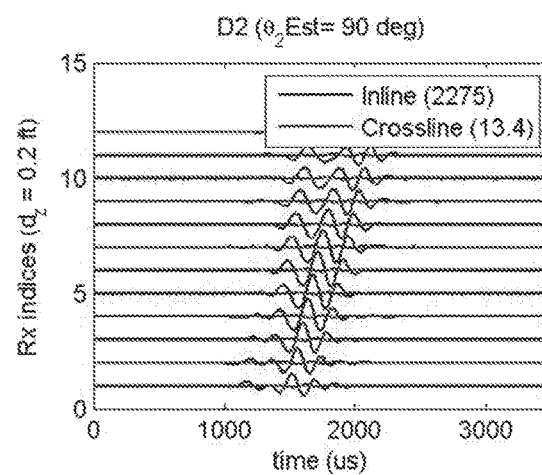
FIG. 21C shows rotated inline and crossline waveforms for the example of FIG. 21A when the inline receivers are parallel to the fast shear direction of the fast formation.

Finally, consider the frequency-domain workflow in a fast formation with the physical parameters given in Table 1 where a single dipole D2 firing direction is 85° from the fast shear direction. Again, the inline and crossline array waveforms can be rotated by a set of pre-determined angles in block 1603. For instance, the inline and crossline array waveforms can be rotated by a set of three pre-determined angles [0°, 20°, 40°, 60°], and the pre-rotated waveforms showing the largest flexural dispersion splitting can be selected. Then, in block 1609, estimated flexural dispersions from the pre-rotated waveforms (block 1605) are used to construct the LWD-DATC cost function (block 1607). In an example shown in FIGS. 21A, 21B and 21C, by applying the multiple pre-rotation angles in block 1603, it is found that the raw inline and crossline array waveforms (rotated by 0°) yield the best flexural dispersion splitting, especially for the formation flexural dispersion at low frequencies. Then, in block 1609, the tool fast and slow flexural dispersion mode estimates between 3.5 and 6 kHz (the upper branch of FIG. 21A shows the tool slow flexural mode and the tool fast flexural mode with dots labelled "slow" and "fast", respectively) as well as the formation fast and slow flexural dispersion mode estimates between 3.5 and 6 kHz (the lower branch of FIG. 21A shows the formation slow flexural mode and the formation fast flexural mode with dots labelled "slow" and "fast", respectively) are extracted from the raw inline and crossline array waveforms and used to compute the LWD-DATC cost function shown in FIG. 20B. The estimated rotation angle is 84.61°. Note that for the assumed fast formation, the difference between the maximum and minimum of the LWD-DATC cost function is significantly smaller than that of the slow formation previously considered. In addition, FIG. 21C displays the rotated inline and crossline array waveforms, where the inline array waveforms clearly exhibit significantly larger amplitudes while the crossline array waveforms are significantly reduced.

In one aspect, some of the methods and processes described above for the time-domain and/or the frequency-domain workflows are performed by a processor. The term "processor" should not be construed to limit the embodiments disclosed herein to any particular device type or system. The processor may include a computer system which can be part of the Logging and Control System 151 of FIG. 6. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Figure 22:
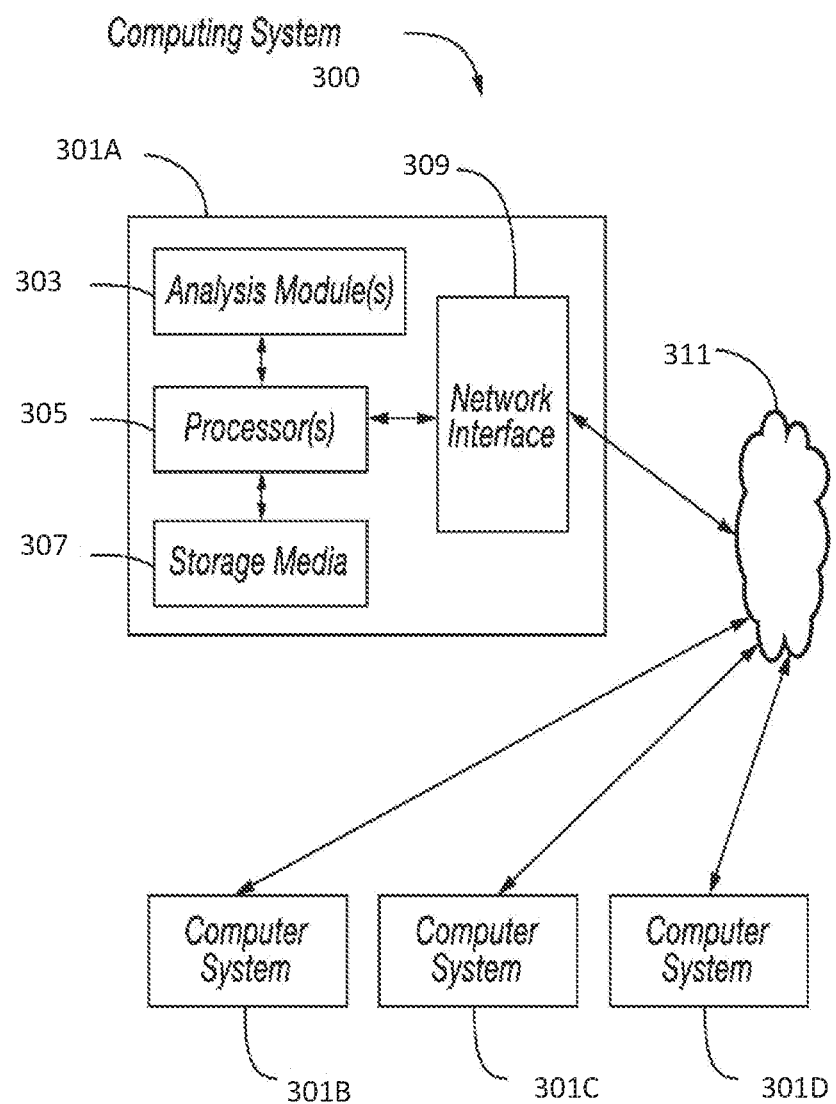
FIG. 22 shows an example computing system that can be used to implement the time-domain and frequency domain workflows as described herein.

FIG. 22 shows an example computing system 300 that can be used to implement the methods and processes described above for the time-domain and/or the frequency-domain workflows or parts thereof. The computing system 300 can be an individual computer system 301A or an arrangement of distributed computer systems. The computer system 301A includes one or more analysis modules 303 (a program of computer-executable instructions and associated data) that can be configured to perform various tasks according to some embodiments, such as the tasks described above. To perform these various tasks, an analysis module 303 executes on one or more processors 305, which is (or are) connected to one or more storage media 307. The processor(s) 305 is (or are) also connected to a network interface 309 to allow the computer system 301A to communicate over a data network 311 with one or more additional computer systems and/or computing systems, such as 301B, 301C, and/or 301D. Note that computer systems 301B, 301C and/or 301D may or may not share the same architecture as computer system 301A, and may be located in different physical locations.

The processor 305 can include at least a microprocessor, microcontroller, processor module or subsystem, programmable integrated circuit, programmable gate array, digital signal processor (DSP), or another control or computing device.

The storage media 307 can be implemented as one or more non-transitory computer-readable or machine-readable storage media. Note that while in the embodiment of FIG. 22, the storage media 307 is depicted as within computer system 301A, in some embodiments, storage media 307 may be distributed within and/or across multiple internal and/or external enclosures of computing system 301A and/or additional computing systems. Storage media 307 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 303 can be provided on one computer-readable or machine-readable storage medium of the storage media 307, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 300 is only one example of a computing system, and that computing system 300 may have more or fewer components than shown, may combine additional components not depicted in the embodiment of FIG. 22, and/or computing system 300 may have a different configuration or arrangement of the components depicted in FIG. 22. The various components shown in FIG. 22 may be implemented in hardware, software, or a combination of both hardware and software, including one or more signal processing and/or application specific integrated circuits.

There have been described and illustrated herein several embodiments of methods and systems for determining fast and slow shear directions in an anisotropic formation using a logging while drilling tool. While particular embodiments of the invention have been described, those skilled in the art will readily appreciate that many modifications are possible in the examples without materially departing from this subject disclosure. For example, the workflows described herein can be adapted to account for both rotation and sliding motion of the logging while drilling tool during excitation of the time-varying pressure field in the formation surround the borehole and the acquisition of waveforms resulting therefrom. Accordingly, all such modifications are intended to be included within the scope of this disclosure as defined in the following claims.

What is claimed is:

1. A method of determining properties of an anisotropic formation surrounding a borehole, comprising:
providing a logging-while-drilling tool that is moveable through the borehole, the logging-while-drilling tool having at least one dipole acoustic source spaced from an array of receivers;
during movement of the logging-while-drilling tool, operating the at least one dipole acoustic source to excite a time-varying pressure field in the anisotropic formation surrounding the borehole, wherein the at least one dipole acoustic source produces a predefined excitation of an oriented dipole transmitter wavefield in the borehole at a particular azimuthal direction;
during the movement of the logging-while-drilling tool, using the array of receivers to measure waveforms arising from the time-varying pressure field in the anisotropic formation surrounding the borehole; and
processing the waveforms measured by the array of receivers to determine a parameter value that represents shear directionality of the anisotropic formation surrounding the borehole, wherein:
the processing involves processing waveforms measured by the array of receivers in the frequency domain for the predefined excitation to evaluate a cost function which is based on a propagation model of dispersion extracted from the waveforms, and
the cost function is evaluated to maximize energy projected onto a signal subspace defined by two Bessel functions J(w) and Y(w) along fast and slow flexural dispersions of the waveforms.

2. A method according to claim 1, wherein the movement of the logging-while-drilling tool involves at least one of rotation and sliding motion of the logging-while-drilling tool.

3. A method according to claim 1, wherein the parameter value represents a fast shear direction of the anisotropic formation.

4. A method according to claim 1, wherein the parameter value represents a slow shear direction of the anisotropic formation.

5. A method according to claim 1, wherein the parameter that represents shear directionality of the anisotropic formation is used to generate synthetically-rotated waveforms, and the synthetically-rotated waveforms are used to estimate dipole shear slowness of the formation.

6. A method according to claim 1, wherein:
the movement of the logging-while-drilling tool involves rotation of the logging-while-drilling tool;
the Bessel function J(w) is configured to account for flexural mode of the formation; and
the Bessel function Y(w) is configured to account for propagation of a drill-collar flexural wave in an annulus between the rotating logging-while-drilling tool and the formation as well as coupling between the moving logging-while-drilling tool and the formation.

7. A method according to claim 1, wherein:
the cost function involves a set of frequency points that are selected based on estimated dispersion of fast and slow flexural modes.

8. A method according to claim 1, wherein:
the propagation model is determined by rotating two-component data vectors over a set of one or more predetermined rotation angles.

9. A method according to claim 8, wherein:
the two-component data vectors are defined by inline and crossline waveforms received by the array of receivers that correspond to the predefined excitation.

10. A method according to claim 8, wherein:
the propagation model is determined by rotating two-component data vectors over a plurality of predetermined rotation angles, and selecting rotated two-component data vectors that show largest flexural dispersion splitting.

11. A method according to claim 10, wherein:
the set of one or more predetermined rotation angles is configured to cover fast shear direction of the formation based on fast shear directions acquired from other depths in the formation.

12. A method according to claim 8, wherein:
the rotated two-component data vectors are used to estimate dispersion of fast and slow flexural modes arising from the predefined excitation of the sonic dipole transmitter; and
the estimated dispersion of fast and slow flexural modes is used to define the propagation model.

* * * * *